(12) United States Patent
Ding et al.

(10) Patent No.: US 12,267,225 B2
(45) Date of Patent: Apr. 1, 2025

(54) ENHANCED SERVICE FUNCTION CHAINING IN NEXT GENERATION CELLULAR NETWORKS

(71) Applicant: INTEL CORPORATION, Santa Clara, CA (US)

(72) Inventors: Zongrui Ding, Portland, OR (US); Qian Li, Beaverton, OR (US); Ching-Yu Liao, Portland, OR (US); Alexandre Saso Stojanovski, Paris (FR); Sudeep Palat, Cheltenham (GB); Thomas Luetzenkirchen, Taufkirchen (DE); Abhijeet Kolekar, Portland, OR (US); Sangeetha Bangolae, Portland, OR (US); Youn Hyoung Heo, Seoul (KR); Xiaopeng Tong, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/553,240

(22) PCT Filed: May 3, 2022

(86) PCT No.: PCT/US2022/027502
§ 371 (c)(1),
(2) Date: Sep. 29, 2023

(87) PCT Pub. No.: WO2022/235690
PCT Pub. Date: Nov. 10, 2022

(65) Prior Publication Data
US 2024/0187331 A1    Jun. 6, 2024

Related U.S. Application Data

(60) Provisional application No. 63/183,996, filed on May 4, 2021.

(51) Int. Cl.
*H04L 45/0377* (2022.01)
*H04L 45/50* (2022.01)

(52) U.S. Cl.
CPC .......... *H04L 45/0377* (2022.05); *H04L 45/50* (2013.01)

(58) Field of Classification Search
CPC ........................... H04L 45/0377; H04L 45/50
(Continued)

(56) References Cited

U.S. PATENT DOCUMENTS

2018/0262431 A1 * 9/2018 Zhang ..................... H04L 47/20
2020/0322881 A1   10/2020 Lee
(Continued)

FOREIGN PATENT DOCUMENTS

WO    20200255025 A1    12/2020
WO    20210001051 A1     1/2021

OTHER PUBLICATIONS

International Search Report and Written Opinion of the International Searching Authority issued Aug. 11, 2022 for corresponding PCT International Application No. PCT/US2022/027502 (7 pp).
(Continued)

*Primary Examiner* — Lan Dai T Truong
(74) *Attorney, Agent, or Firm* — Eversheds Sutherland (US) LLP

(57) ABSTRACT

This disclosure describes systems, methods, and devices related to service function chaining in wireless networks. A communications system may include a communication control function to select one or multiple communication service functions associated with establishing service function chaining (SFC) services for telecommunications; a service orchestration and chaining function (SOCF) to establish the
(Continued)

SFC services; and a service orchestration exposure function (SOEF) to expose the SFC services to an application function (AF) of the system.

20 Claims, 12 Drawing Sheets

(58) Field of Classification Search
USPC .......................................................... 709/238
See application file for complete search history.

(56) References Cited

U.S. PATENT DOCUMENTS

| 2022/0094638 A1* | 3/2022 | Dutta ..................... H04L 45/302 |
| 2022/0150160 A1* | 5/2022 | Kumar ..................... H04L 67/10 |
| 2023/0266961 A1* | 8/2023 | Robitzsch ........... H04L 41/5041 717/168 |
| 2024/0080265 A1* | 3/2024 | Robitzsch ............. H04L 45/306 |

OTHER PUBLICATIONS

Nokia et al., "Service requirements for enhancing service function chaining support by 5G Network," SP-201090, 3GPP TSG-SA Meeting #90-e, e-Meeting, Dec. 11, 2020.
"3GPP; TSG SA; Procedures for the 5G System (5GS); Stage 2 (Release 17)," 3GPP TS 23.502 V17.0.0, Mar. 31, 2021 (Sections 5.1-5.2.8.3.4).

* cited by examiner

ENHANCED SERVICE FUNCTION CHAINING IN NEXT GENERATION CELLULAR NETWORKS

CROSS-REFERENCE TO RELATED APPLICATION(S)

This application is a U.S. National Stage Application under 35 U.S.C. 371 and claims the priority benefit of International Application No. PCT/US2022/027502, filed May 3, 2022 and Provisional Application No. 63/183,996, filed May 4, 2021, the disclosures of which are incorporated by reference as set forth in full.

TECHNICAL FIELD

This disclosure generally relates to systems and methods for wireless communications and, more particularly, to network and user equipment device collaboration for machine learning in $6^{th}$ Generation (6G) communications.

BACKGROUND

Wireless devices are becoming widely prevalent and are increasingly using wireless channels. The $3^{rd}$ Generation Partnership Program (3GPP) is developing one or more standards for wireless communications.

DETAILED DESCRIPTION

Figure 1:
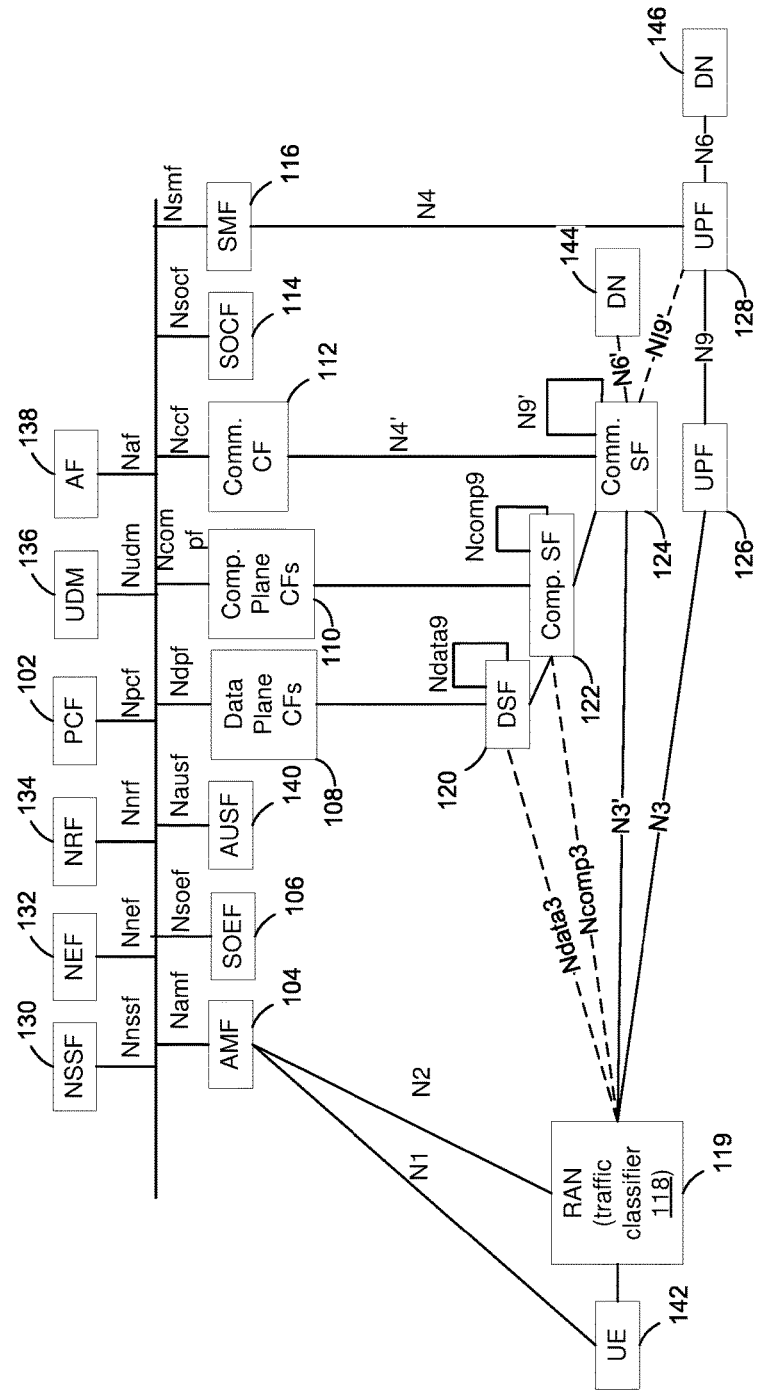
FIG. 1 shows an example $6^{th}$ Generation (6G) system architecture, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Wireless devices may perform measurements as defined by technical standards. For cellular telecommunications, standardization groups such as the $3^{rd}$ Generation Partnership Program (3GPP) and the Open Radio Access Network (O-RAN) Alliance define communication techniques, including for service function chaining in $6^{th}$ Generation (6G) cellular devices and cellular networks.

One 6G trend is the integration of information technology (IT) and communication technology (CT) with the deeper penetration of a cloud-native paradigm, such as virtualization, programmability, automation, micro-service, etc. to telecommunications networks. The 6G network is expected to provide end-to-end services with most applications transforming into a micro-service based with an enhanced architecture with computing, data, and communication planes. This enables flexible on-board and off-board service functions such as application instances, computing tasks, data pre-processing and storage. To realize different service logic along the traffic path, the capability of service function chaining (SFC) is required. SFC refers to steering traffic using sequences of virtualized/containerized network functions (VNFs/CNFs—virtual machines or containers that host virtualized/containerized network services).

Modern orchestration and management technologies are able to create virtual paths among different VNFs/containerized network functions (CNFs), but the $5^{th}$ Generation (5G) user plane based on end-to-end tunneling between gNB and UPFs cannot efficiently steer the traffic to an ordered list of SFs. In 3GPP release 18, a working item (WI) is being discussed for SFC of functions such as network address translation (NAT), deep packet inspection (DPI), lawful intercept (LI), etc. This WI mainly focuses on the enhancement for the current 5G architecture.

Some solutions include an architecture and standardized header as a service layer encapsulation. However, existing solutions do not directly apply to the cellular network because (1) the SFC architecture considered in the IETF SFC framework is assumed to be in one administrative domain, and the underlying connectivity is out of its scope and as an assumption. However, both the service functions and the transport network need to be properly configured. (2) The control plane for the IETF SFC architecture is out of the scope of the framework. (3) The standardized NSH includes the basic header for parameters such as protocol type, TTL, and the service path identifier (SPI), locator and metadata. These information elements can be properly configured through cellular control plane to the traffic path so that the NSH may not directly apply.

There is therefore a need to enable SFC in 6G networks.

In one or more embodiments, to enable efficient SFC in 6G, the following functions and procedures are provided in the present disclosure: (1) Communication plane control and user plane functions are introduced as communication (comm.) control function (CF)/comm. service function (SF) to provide communication service among the service functions to enable SFC. (2) Service orchestration and chaining function (SOCF) is introduced to generate the required SFC logic and transport/networking configuration to instruct the corresponding computing (comp.)/data/comm. planes to enable SFC. (3) Service orchestration exposure function (SOEF) is introduced to expose the capability of SFC to third parties, such as applications to influence on demand to SFC. (4) How to setup SFC service based on UE/AF's request on control plane. (5) How to perform SOCF selection, SOEF service discovery, subscription and notification of a SFC event.

In one or more embodiments, the 6G architecture enabling SFC for the computing/data service functions is described in this disclosure including proposed comm. CF/SF to provide communication service for SFC, SOCF to provide orchestration and chaining, and SOEF to expose the orchestration and chaining services to AF. Procedures for UE or AF to request for a SFC service via SOCF/SMF or SOEF are proposed based on different options.

In one or more embodiments, the present disclosure uses the following terminologies and the corresponding definition: (1) Service function (SF): A function, specifically representing network service function, that is responsible for specific treatment of received packets other than the normal, standard functions of an IP router (e.g., IP forwarding and routing functions) on the network path between a source host and destination host. (2) Service function chain (SF chain): A chain that defines an ordered set of abstract service functions and ordering constraints that must be applied to packets and/or frames and/or flows selected as a result of classification and/or policy. (3) Service function chaining (SFC): A mechanism of building service function chains and forwarding packets/frames/flows through them. The present disclosure considers the service functions that need to be processed in different planes, including computation plane, communication plane, and data plane. The service function chain is with service functions across different planes.

In one or more embodiments, the 6G architecture includes the proposed Comm. CF/SF, SOCF, and SOEF to enable SFC. The computing plane functions and data plane functions for control plane and user plane are defined respectively to enable computing/data as a service. The Comm. CF/SF, SOCF, and SOEF are new functions (e.g., added to the 5G architecture). 5G functions such as AMF, PCF, SMF, UPF may need an enhancement to support SFC with the proposed architecture.

In one or more embodiments, the comm. CF connects to comm. SF via N4', and a comm. CF can connect and control multiple comm. SFs. The comm. CF connects to other network functions (NFs) through a service-based interface (SBI) named Nccf. The SOCF and SOEF connects to other NFs through SBI named Nsocf and Nsoef respectively. A comm. SF connects to the RAN via N3' or another comm. SF via N9'. A comm. SF can optionally connect to a UPF by NI9' to interwork with a 5G UPF or an enhanced UPF (eUPF) working as a PDU session anchor (PSA) or connect directly to a DN via N6'. The interfaces between Comp/Data SF and RAN are named Ncomp3 (N3' in the figure) and Ndata3 respectively. These functions may be NFs in CN, and they can also be deployed as RAN functions to provide corresponding services. A traffic classifier can be an additional function at RAN to differentiate SFC and non-SFC traffic and classify SFC traffic based on different rules.

In one or more embodiments, the functionalities of comm. CF include, but are not limited to, communication service management to SFC or non-SFC services to other NFs via Nccf, selection and control of comm. SF for setting up SFC or non-SFC communication services (e.g., select Comm SF based on capabilities, location for mobility), configuration of one or multiple comm. SFs via N4' for the following: (1) The supported transport/networking protocols of different layers, (2) The matching rules for a traffic flow based on criteria such as protocol, meta-data, physical or virtual port ID, packet filter like the IP 5 tuple, ethernet address, vLAN tag, etc., (3) The routing information for a traffic flow based on the traffic matching rules, and (4) The action taken for a traffic flow based on the traffic matching rules. The functionalities of comm. CF also may include life cycle management of comm. SFs, i.e., onboard, offboard or migrate, and charging data collection for communication services.

In one or more embodiments, the functionalities of comm. SF include, but are not limited to, communication services such as packet routing and forwarding on user plane based on different protocols and traffic rules, attachment, modification, or removal of packet labels based on configuration from comm. CF, application of traffic rules such as traffic matching rules and taking required actions based on the configuration from comm. CF, anchor point to handle UE's mobility to complement UPF, and traffic monitoring and reporting to comm. CF.

In one or more embodiments, the functionalities of SOCF include, but are not limited to, providing service orchestration and chaining services, e.g., SFC establishment, modification and release to NFs via Nsocf, generating joint comp./comm./data plane decisions (e.g., about service placement) and requests based on service orchestration requirements, and generating a charging record based on transactions about SFC.

In one or more embodiments, the functionalities of SOEF include, but are not limited to, exposing the service orchestration and chaining capabilities to third parties, such as AFs, supporting service discovery of service orchestration and chaining to AFs, handling service orchestration and chaining requests based on the configured policies of the cellular network, generating service requirements to SOCF to request for orchestration and chaining services from AFs, and exposure of interfaces to AFs to manage NFs as well as firmware and profiles used by NF software/hardware. For example, vendors can provide hardware platform 25/accelerator technologies to improve UPF or other NFs' performance such as throughput and latency, also including SFC support directly in the accelerator.

In one or more embodiments, the SFC service context may refer to the information to define SFC service and related requirements, generally including two aspects: the SFC information, and the transport/networking information. The SFC context information is exchanged during the setup of a SFC logic with the related control plane functions such as SOCF, SMF, comp./data/comm. CFs. Then the control plane functions can further configure the required user plane functions on the SFC path. SFC information includes but not limited to: Service ID: identify a SFC service; Application ID/Type, e.g., APN/DNN; UE ID/UE group ID; Network slice ID; Access type; PDU session ID and related information such as PSAs if the SFC service belongs to a PDU session; Traffic Type/classification rules; Security related information: keys, credentials; Service continuity mode;

SFC requirements: Required network chains for SFs such as comp./data service information and its order; the related metadata to describe the computing capabilities and workloads and the data functions and storage as described in computing manifest, and required QoS such as the QoS characteristics on the traffic flow like GBR, non-GBR, priority, maximum data rate, latency, etc. and additional requirements on service function processing such as required computing resource, processing priority, delay, etc.; required capabilities such as protocols for data description protocol; and required location of the Comp/data service functions. The transport/networking information includes, but is not limited to, the typical SFC dynamic configuration information will include: network and interface information such as ethX, network CIDR, and network type: VLAN, etc. Transport/networking mapping/routing rule: Required overlay/underlay such as enhanced UPF to support GTP tunneling, Segment Routing (SR) as a transport/networking protocol; required communication model such as load balancing, multipath, etc.; and required protocol and encapsulation options such as without service layer encapsulation, with service layer encapsulation, or with service layer and SR combination encapsulation.

In one or more embodiments, the SOCF orchestration and chaining services are summarized below in Table 1:

authentication/authorization, e.g., with UDM for UE's subscription. A SFC service ID may be allocated, e.g., by SOCF or PCF. The service ID can also be pre-configured through the RAN/CN. SMF binds the related SFC policy with the service ID, SFC flow, possible PDU session to which the SFC flow belongs. The SMF performs comm. SF and UPF selection and requests for a configuration update to comm. SF and UPFs via N4 and N4'. The comm. SF and UPF perform the related configuration for SFC user plane to set up the SFC traffic path. The SMF requests for comp/data SFs included in the SFC service such as a computing task or data pre-processing. The comp./data CF perform comp./data SF on-board, offboard, selection and apply the related configuration to the service functions. The service ID and SFC context is notified to RAN, e.g, via AMF and N2. The service ID and full/partial SFC context is notified to UE, e.g., via PDU session establishment accept message.

In one or more embodiments, SOCF/comm. CF are separate functions and SMF leverages SOCF for SFC service setup. In this option, the SOCF and comm. CF are separate functions, the services of which can be leveraged by the SMF during a PDU session establishment/modification. Step 1 is the same as described in Step 1 of the option described in the preceding paragraph. Step 2 is the same as described in Step 2 of the option described in the preceding paragraph.

TABLE 1

| SOCF Orchestration and Chaining Services: | | | |
| --- | --- | --- | --- |
| Service Name | Service Operations | Operation Semantics | Example Consumer(s) |
| Nsocf_SFC | Create | Request/Response | V-SOCF/I-SOCF |
| | Update | Request/Response | V-SOCF/I-SOCF, H-SOCF |
| | Release | Request/Response | V-SOCF/I-SOCF |
| | CreateSFCContext | Request/Response | AMF, SMF |
| | UpdateSFCContext | Request/Response | AMF, SMF |
| | ReleaseSFCContext | Request/Response | AMF, SMF |
| | SFCContextStatusNotify | Subscribe/Notify | AMF, SMF |
| | StatusNotify | Subscribe/Notify | V-SOCF/I-SOCF |
| | Context | Request/Response | AMF, I-SOCF, SOCF |
| | ContextPush | Request/Response | SOCF |
| Nsocf_EventExposure | Subscribe | Subscribe/Notify | NEF, AMF, SOEF |
| | Unsubscribe | | NEF, AMF, SOEF |
| | Notify | | NEF, AMF, SOEF |
| | AppRelocationInfo | | AF, SOEF |

In one or more embodiments, the Nsocf_SFC (e.g., create, update, release) are services provided to V/I-SOCF for roaming purposes similar to Nsmf_PDUSession (e.g., create, update, release) as described in clause 5.2.8.1 3GPP TS 23.502. The Nsocf_SFC (e.g., CreateSFCContext, UpdateSFCContext, ReleaseSFCContext) are services provided to establish/update/release the SFC context information to setup/modify/delete a SFC flow. The other services are subscription/notifications to expose SFC related information and event to a NF such as SOEF, AMF, SMF, etc. SOCF can be an enhanced functionality to an existing NF for 5G such as a SMF or a standalone function.

In one or more embodiments, there may be a modification to the PDU session establishment/modification. In this option, the SOCF and comm. CF functionalities are considered as enhancements to the current SMF. UE follows the PDU session establishment/modification procedure 3GPP TS 23.502 to request SFC service by sending the SFC service context as described in 5.1.3 of 3GPP TS 23.502 and an indicator of SFC service. The SMF performs related SMF selects a SOCF to set up the SFC service, which can be based on the SFC service context as described in 5.1.3 of 3GPP TS 23.502 or other criteria such as a load balancing rule. The SOCF or PCF can allocate the service ID as part of the SFC policy, or the service ID can be pre-configured similar to Step 3 of the option described in the preceding paragraph. Based on the SFC service requirements, SOCF generates related requirements for comm./comp./data planes and request service to comm./comp./data CFs. The comm./comp./data SFs are properly selected, onboarded and configured by the comm./comp./data CFs for the SFC. The service ID and SFC context is notified to RAN, e.g, via AMF and N2 message. The service ID and full/partial SFC context is notified to UE, e.g., via PDU session establishment accept message.

In one or more embodiments, another option is to have the SOCF process the SFC service request, different from the PDU session establishment/modification described above. In this option, the PDU session establishment/modification procedure is not modified. The AMF generates a SFC service establishment/modification request by leveraging the SOCF services. If the SFC service path involves a UPF, the SOCF can leverage SMF's service to select/configure a UPF. UE requests for SFC service via a new message with the SFC service context, which can be a new NAS message parsed by AMF, which then generates a request for Nsocf_CreateSFCContext to SOCF. This step may include the selection of a SOCF. The SOCF performs related authentication/authorization, e.g., with UDM for UE's subscription. The SOCF or PCF can allocate the service ID as part of the SFC policy, or the service ID can be pre-configured. Based on the SFC service requirements, SOCF generates related requirements for comm./comp./data planes and request service to comm./comp./data CFs. Optionally, if the SFC involves a UPF, SOCF can send a request to configure the corresponding UPF via a PDU session modification message or a new message. This request may include the criteria of UPF selection such as location, capabilities, the UE ID, service ID, SFC context, charging rules, etc. The comm./comp./data SFs are properly selected, onboarded and configured by the comm./comp./data CFs for the SFC. Optionally, if Step 6 is involved in the message flow, UPFs can be properly selected and configured for the SFC. The service ID and SFC context is notified to RAN, e.g, via AMF and N2 message. The service ID and full/partial SFC context is notified to UE, e.g., via a SFC service establishment accept message which may be different from a PDU session establishment accept message.

In one or more embodiments, regarding SOCF selection, in Option 2 and Option 3 as described in Sections 5.1.3.2 and 5.1.2.3 of 3GPP TS 23.502, the AMF or SMF may need to perform a SOCF selection, which may be based on NRF as defined in 3GPP TS 23.501. SOCF registers to the NRF with the information such as its location, capabilities, network slice, managed application type, orchestration performance metrics, etc. NF such as AMF/SMF can query the NRF for with the appropriate criteria of SOCF selection and select from a list of SOCFs to serve a specific SFC request. The criteria can include, but is not limited to, SOCF performance requirements, location, network slice, specific requirements on comm./comp./data plane that SOCF performs orchestration and chain up for.

In one or more embodiments, the present disclosure provides a procedure of SOEF for exposure of orchestration and chaining service capabilities and events. Regarding SOEF exposure of orchestration and chaining service to AF, the AF perform service discovery to SOEF for the supported orchestration and chaining capabilities by the cellular network. AF sends a service discovery request to SOEF for the supported orchestration and chaining capabilities include the following: To setup a SFC service for an application based on the requirements from AF; to modify a SFC service for an application from AF; to subscribe to a SFC events and get notified by the SOEF; application level information about a service function, e.g., an identifier to a service function image or a description of a service function type. SOEF sends a service discovery response to AF for the supported orchestration and chaining capabilities as indicated in Step 1.

In one or more embodiments, the AF may request to influence orchestration and chaining service or SFC flows. The AF can request to setup SFC policy for an application, set up or modify SFC flows based on some criteria. AF requests for SFC service or policy establishment or modification to SOEF including the criteria for the service SOEF can request authorization and verification for the request with, e.g., UDM or PCF SOEF sends a response for the SFC service or policy establishment/modification. If the request was not successful, a reason may be included. SOEF sends a request for SFC service or policy establishment/modification to SOCF, SMF or PCF to perform the authorized request on SFC based on the options described in 5.1.3 of 3GPP TS 23.502.

In one or more embodiments, the AF subscribes to the orchestration and chaining related events. There may be a message flow for the AF to subscribe to SFC events and be notified. For example, AF sends a request to subscribe to existing SFC service events or orchestration and chaining service events to SOEF. This message may include: a description of the event, a SFC flow ID, application ID, UE ID or UE group ID, and/or criteria for a SFC flow based on the SFC context. SOEF can request authorization and verification for the request with, e.g., UDM or PCF. After authorization, SOEF requests to subscribe to existing SFC service events or orchestration and chaining service events to SOCF. SOEF sends a response to the AF to indicate whether the subscription is successful or not. In case of a failure, a reason may be included. SOCF sends a notification to SOEF based on the criteria set by AF/SOEF when a related event is detected. SOEF sends a notification to AF about the detected events.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 shows an example $6^{th}$ Generation (6G) system architecture 100, in accordance with one or more example embodiments of the present disclosure.

Figure 10:
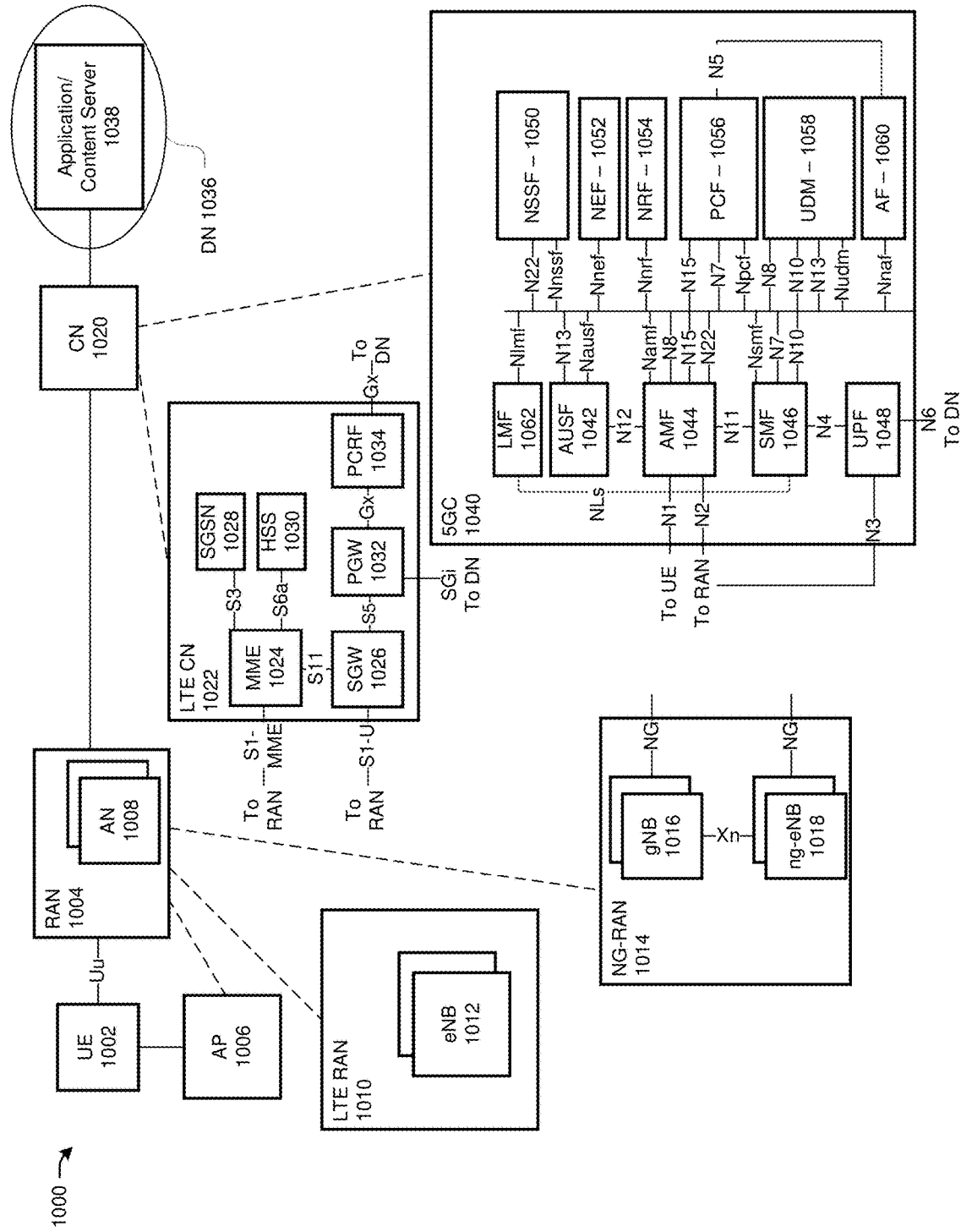
FIG. 10 illustrates a network, in accordance with one or more example embodiments of the present disclosure.

Referring to FIG. 1, the 6G system architecture 100 enhances (e.g., from the existing 5G system architecture as shown in FIG. 10) a PCF 102, an AMF 104, adds (e.g., to the existing 5G system architecture as shown in FIG. 10) a SOEF 106, data plane CFs 108, comp. plane CFs 110, a comm. CF 112, a SOCF 114, enhances a SMF 116 (e.g., from the existing 5G system architecture as shown in FIG. 10), adds a traffic classifier 118 to a RAN 119, adds a DSF 120, adds a comp. SF 122, adds a comm. SF 124, adds a UPF 126, and adds a UPF 128.

Still referring to FIG. 1, the 6G system architecture 100 includes, from the 5G architecture (e.g., shown in FIG. 10), a NSSF 130, an NEF 132, an NRF 134, a UDM 136, an AF 138, an AUSF 140, a UE 142, a DN 144, and a DN 146.

In one or more embodiments, the functionalities of comm. CF 112 include, but are not limited to, communication service management to SFC or non-SFC services to other NFs via Nccf, selection and control of comm. SF for setting up SFC or non-SFC communication services (e.g., select comm. SF 124 based on capabilities, location for mobility), configuration of one or multiple comm. SFs via N4' for the following: (1) The supported transport/networking protocols of different layers, (2) The matching rules for a traffic flow based on criteria such as protocol, meta-data, physical or virtual port ID, packet filter like the IP 5 tuple, ethernet address, vLAN tag, etc., (3) The routing information for a traffic flow based on the traffic matching rules, and (4) The action taken for a traffic flow based on the traffic matching rules. The functionalities of comm. CF 112 also may include life cycle management of comm. SFs, i.e., onboard, offboard or migrate, and charging data collection for communication services.

In one or more embodiments, the functionalities of comm. SF 124 include, but are not limited to, communication services such as packet routing and forwarding on user plane based on different protocols and traffic rules, attachment, modification, or removal of packet labels based on configuration from comm. CF 112, application of traffic rules such as traffic matching rules and taking required actions based on the configuration from comm. CF, anchor point to handle mobility of the UE 142 to complement the UPF 126, and traffic monitoring and reporting to comm. CF 112.

In one or more embodiments, the functionalities of SOCF 114 include, but are not limited to, providing service orchestration and chaining services, e.g., SFC establishment, modification and release to NFs via Nsocf or to a UE, generating comp./comm./data plane configurations and requests based on service orchestration requirements, and generating a charging record based on transactions about SFC.

In one or more embodiments, the functionalities of SOEF 106 include, but are not limited to, exposing the service orchestration and chaining capabilities to third parties such as AFs, supporting service discovery of service orchestration and chaining to AFs, handling service orchestration and chaining requests based on the configured policies of the cellular network, generating service requirements to SOCF 114 to request for orchestration and chaining services from AFs, and exposure of interfaces to AFs to manage NFs as well as firmware and profiles used by NF software/hardware. For example, vendors can provide hardware platform/accelerator technologies to improve UPF 126 or other NFs' performance such as throughput and latency, also including SFC support directly in the accelerator. SOEF 106 can be an enhanced functionality to NEF 132 or a standalone function.

In one or more embodiments, the SFC service context may refer to the information to define SFC service and related requirements, generally including two aspects: the SFC information, and the transport/networking information. The SFC context information is exchanged during the setup of a SFC logic with the related control plane functions such as SOCF 114, SMF 116, comp./data/comm. CFs 108, 110, 112. Then the control plane functions can further configure the required user plane functions on the SFC path. SFC information includes but not limited to: Service ID: identify a SFC service; Application ID/Type, e.g., APN/DNN; UE ID/UE group ID; Network slice ID; Access type; PDU session ID and related information such as PSAs if the SFC service belongs to a PDU session; Traffic Type/classification rules; Security related information: keys, credentials; Service continuity mode; SFC requirements: Required network chains for SFs such as comp./data service information and its order; the related metadata to describe the computing capabilities and workloads and the data functions and storage as described in computing manifest, and required QoS such as the QoS characteristics on the traffic flow like GBR, non-GBR, priority, maximum data rate, latency, etc. and additional requirements on service function processing such as required computing resource, processing priority, delay, etc.; required capabilities such as protocols for data description protocol; and required location of the Comp/data service functions. The transport/networking information includes, but is not limited to, the typical SFC dynamic configuration information will include: network and interface information such as ethX, network CIDR, and network type: VLAN, etc. Transport/networking mapping/routing rule: Required overlay/underlay such as enhanced UPF 126 to support GTP tunneling, Segment Routing (SR) as a transport/networking protocol; required communication model such as load balancing, multipath, etc.; and required protocol and encapsulation options such as without service layer encapsulation, with service layer encapsulation, or with service layer and SR combination encapsulation.

In one or more embodiments, the SOCF 114 orchestration and chaining services are summarized above in Table 1.

In one or more embodiments, the Nsocf_SFC (e.g., create, update, release) are services provided to V/I-SOCF for roaming purposes similar to Nsmf_PDUSession (e.g., create, update, release) as described in clause 5.2.8.1 3GPP TS 23.502. The Nsocf_SFC (e.g., CreateSFCContext, UpdateSFCContext, ReleaseSFCContext) are services provided to establish/update/release the SFC context information to setup/modify/delete a SFC flow. The other services are subscription/notifications to expose SFC related information and event to a NF such as SOEF 106, AMF 104, SMF 116, etc. SOCF 114 can be an enhanced functionality to an existing NF for 5G such as the SMF 116 or a standalone function.

Figure 2:
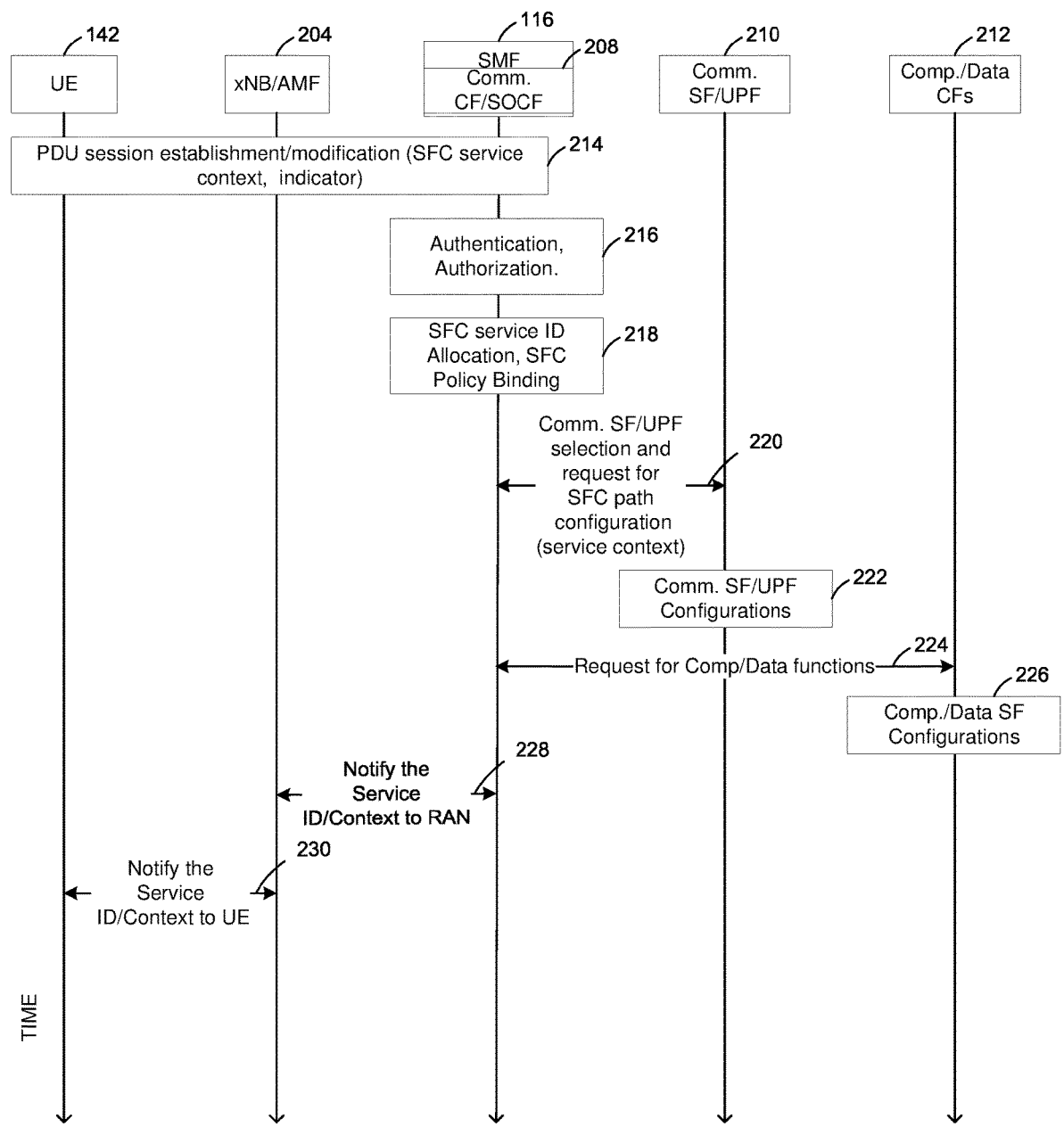
FIG. 2 shows a process for performing a service function chaining (SFC) service as an enhancement to a $5^{th}$ Generation (5G) system architecture, in accordance with one or more example embodiments of the present disclosure.

FIG. 2 shows a process 200 for performing a service function chaining (SFC) service as an enhancement to a $5^{th}$ Generation (5G) system architecture, in accordance with one or more example embodiments of the present disclosure.

Referring to FIG. 2, the enhancement may be to the 5G SMF 1046 shown in FIG. 10 (e.g., the enhancement representing the SMF 116 of FIG. 1). In particular, the SFC service may be established through the SOCF 114 and/or the comm. CF 112 of FIG. 1. The process 200 may include the UE 142 of FIG. 1, a node B (xNB)/AMF 204 (e.g., a node B of the RAN 119 of FIG. 1, the AMF 104 of FIG. 1), the SMF 116 of FIG. 1, a comm. CF/SOCF 208 (e.g., the comm. CF 112 of FIG. 1, the SOCF 114 of FIG. 1), a comm. SF/UPF 210 (e.g., the comm. SF 124 of FIG. 1, the UPF 126 of FIG. 1), and comp./data CFs 212 (e.g., the comp. plane CFs 110 of FIG. 1, the data plane CFs 108 of FIG. 1). At step 214, the UE 142 follows the PDU session establishment/modification procedure in 3GPP TS 23.502 to request SFC service by sending the SFC service context as described in 5.1.3 and an indicator of SFC service. At step 216, the SMF 116 performs related authentication/authorization, e.g., with the UDM 136 of FIG. 1 for UE's subscription. At step 218, a SFC service ID may be allocated, e.g., by the SOCF 114 of FIG. 1 or the PCF 102 of FIG. 1. The service ID can also be pre-configured through the RAN/CN. The SMF 116 binds the related SFC policy with the service ID, SFC flow, and possible PDU session to which the SFC flow belongs. At step 220, the SMF 116 performs comm. SF and UPF 210 selection and requests for a configuration update to comm. SF and UPFs (e.g., via N4 and N4' as shown in FIG. 1). At step 222, the comm. SF and UPF 210 perform the related configuration for SFC user plane to set up the SFC traffic path. At step 224, the SMF 116 requests for comp./data SFs included in the SFC service such as a computing task or data pre-processing. At step 226, the comp./data CFs 212 configure the comp./data SFs requested by the SMF 116. At step 228, the service ID and SFC context is notified to RAN, (e.g, via AMF and N2 as shown in FIG. 1). At step 230, the service ID and full/partial SFC context is notified to the UE 142 (e.g., via a PDU session establishment accept message).

Figure 3:
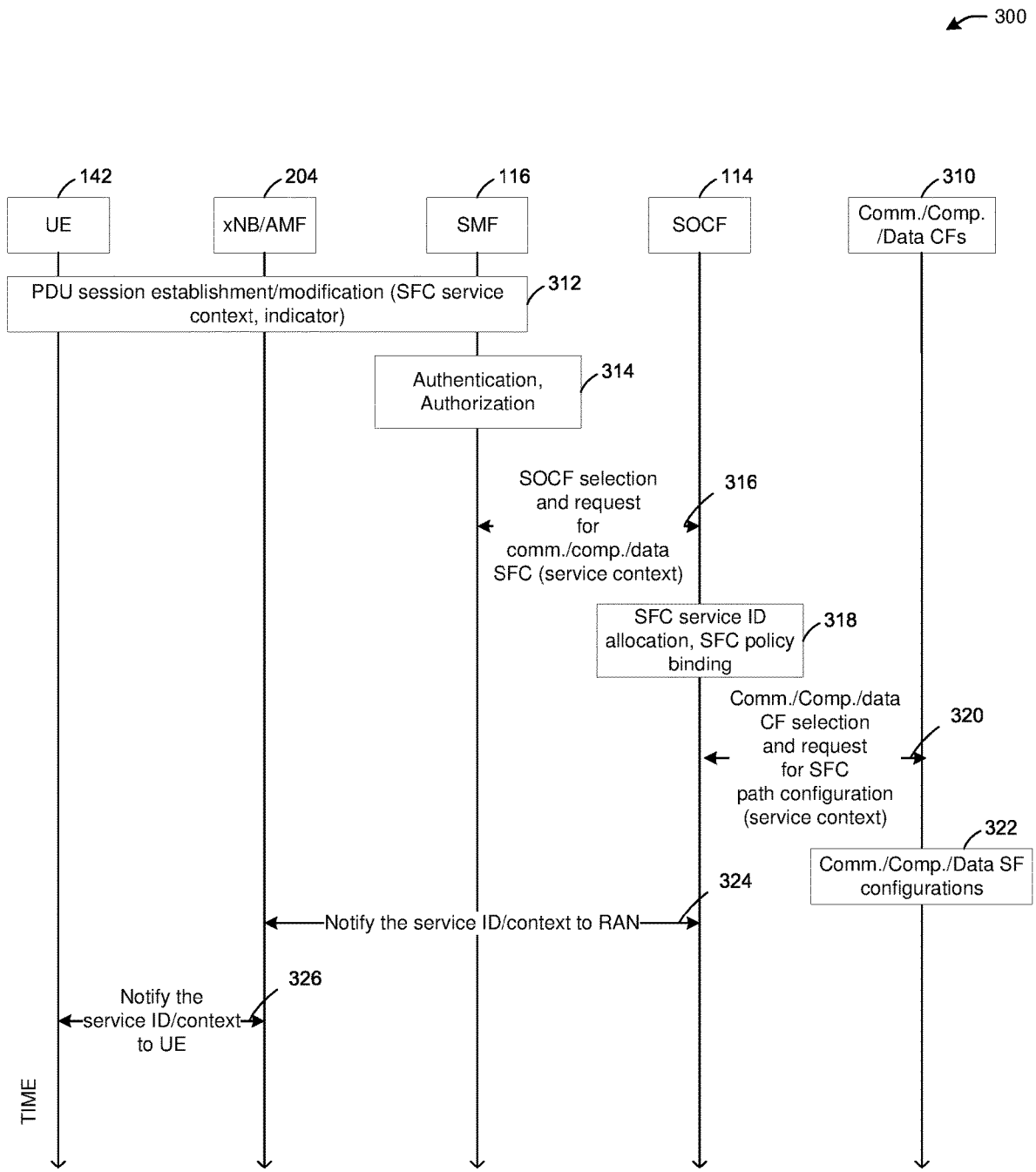
FIG. 3 shows a process for performing a SFC service as an enhancement to 5G system architecture, in accordance with one or more example embodiments of the present disclosure.

FIG. 3 shows a process 300 for performing a service function chaining (SFC) service as an enhancement to 5G system architecture, in accordance with one or more example embodiments of the present disclosure.

Referring to FIG. 3, the enhancement may be adding the SOCF 114 of FIG. 1 (e.g., to the 5GC 1040 shown in FIG. 10. The process 300 may include the UE 142 of FIG. 1, the node B (xNB)/AMF 204 of FIG. 2, the SMF 116 of FIG. 1, the SOCF 114, an comm./comp./data CFs 310 (e.g., the comp. plane CFs 110 of FIG. 1, the data plane CFs 108 of FIG. 1, the comm. CF 112 of FIG. 1). At step 312, the UE 142 follows the PDU session establishment/modification procedure in 3GPP TS 23.502 to request SFC service by sending the SFC service context as described in 5.1.3 and an indicator of SFC service. At step 314, the SMF 116 performs related authentication/authorization, e.g., with the UDM 136 of FIG. 1 for UE's subscription. At step 316, the SMF 116 selects the SOCF 114 to set up the SFC service, which can be based on the SFC service context as described in 5.1.3 or other criteria such as a load balancing rule. At step 318, the SOCF 114 or the PCF 102 of FIG. 1 may allocate the service ID as part of the SFC policy, or the service ID can be pre-configured. At step 320, based on the SFC service requirements, the SOCF 114 generates related requirements for comm./comp./data planes and requests service to the comm./comp./data CFs 310. At step 322, the comm./comp./data SFs are properly selected, onboarded, and configured by the comm./comp./data CFs 310 for the SFC. At step 324, the service ID and SFC context is notified to RAN (e.g., via AMF and N2 message as shown in FIG. 1). At step 326, the service ID and full/partial SFC context is notified to the UE 142 (e.g., via a PDU session establishment accept message).

Figure 4:
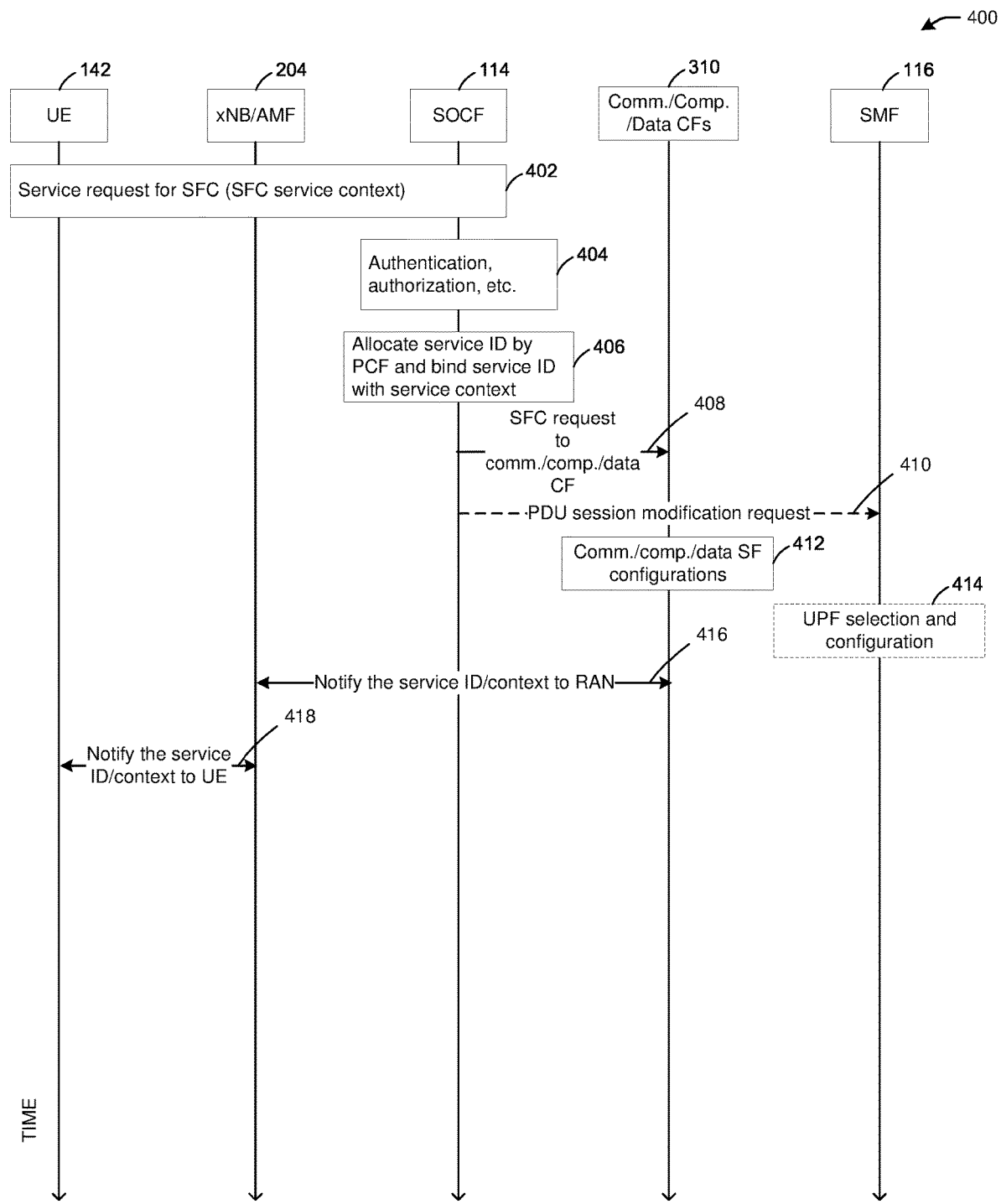
FIG. 4 shows a process for performing a SFC service as an enhancement to 5G system architecture, in accordance with one or more example embodiments of the present disclosure.

FIG. 4 shows a process 400 for performing a SFC service as an enhancement to 5G system architecture, in accordance with one or more example embodiments of the present disclosure.

Referring to FIG. 4, the process 400 may include the UE 142 of FIG. 1, the node B (xNB)/AMF 204 of FIG. 2, the SMF 116 of FIG. 1, the SOCF 114, and the comm./comp./data CFs 310 of FIG. 3. At step 402, the UE 142 requests for SFC service via a new message with the SFC service context, which can be a new NAS message parsed by the AMF 104 of FIG. 1, which then generates a request for Nsocf_CreateSFCContext to the SOCF 114. This step may include the selection of the SOCF 114. At step 404, the SOCF 114 performs related authentication/authorization, e.g., with the UDM 136 of FIG. 1, for the UE's subscription. At step 406, the SOCF 114 or the PCF 102 of FIG. 1 can allocate the service ID as part of the SFC policy, or the service ID can be pre-configured. At step 408, based on the SFC service requirements, the SOCF 114 generates related requirements for comm./comp./data planes and requests service to the comm./comp./data CFs 310. At step 410, optionally, if the SFC involves a UPF, the SOCF 114 can send a request to configure the corresponding UPF via a PDU session modification message or a new message. This request may include the criteria of UPF selection such as location, capabilities, the UE ID, service ID, SFC context, charging rules, etc. At step 412, the comm./comp./data SFs are properly selected, onboarded and configured by the comm./comp./data CFs 310 for the SFC. At step 414, optionally, if step 412 is involved in the message flow, UPFs can be properly selected and configured for the SFC. At step 416, the service ID and SFC context is notified to RAN (e.g, via AMF and N2 message as shown in FIG. 1). At step 418, the service ID and full/partial SFC context is notified to the UE 142, e.g., via a SFC service establishment accept message, which may be different from a PDU session establishment accept message.

Figure 5:
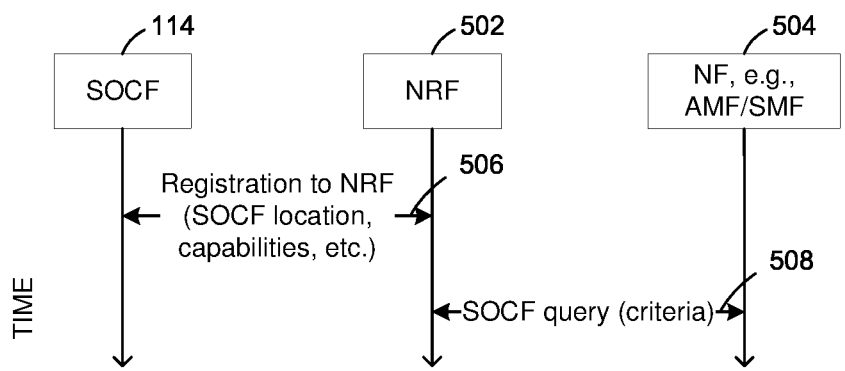
FIG. 5 shows a process for selecting a service orchestration and chaining function (SOCF) for performing a SFC service as an enhancement to 5G system architecture, in accordance with one or more example embodiments of the present disclosure.

FIG. 5 shows a process for selecting a SOCF for performing a SFC service as an enhancement to 5G system architecture, in accordance with one or more example embodiments of the present disclosure.

Referring to FIG. 5, the process 500 may include the SOCF 114 of FIG. 1, a NRF 502, and a NF 504 (e.g., an AMF/SMF). At step 506, the SOCF 114 registers to the NRF 520 with information such as its location, capabilities, network slice, managed application type, orchestration performance metrics, and the like. At step 508, the NF 504, such as AMF/SMF, can query the NRF 502 for with the appropriate criteria of SOCF selection and select from a list of SOCFs to serve a specific SFC request. The criteria can include, but is not limited to, SOCF performance requirements, location, network slice, specific requirements on comm./comp./data plane for which the SOCF 114 performs orchestration and chaining.

Figure 6:
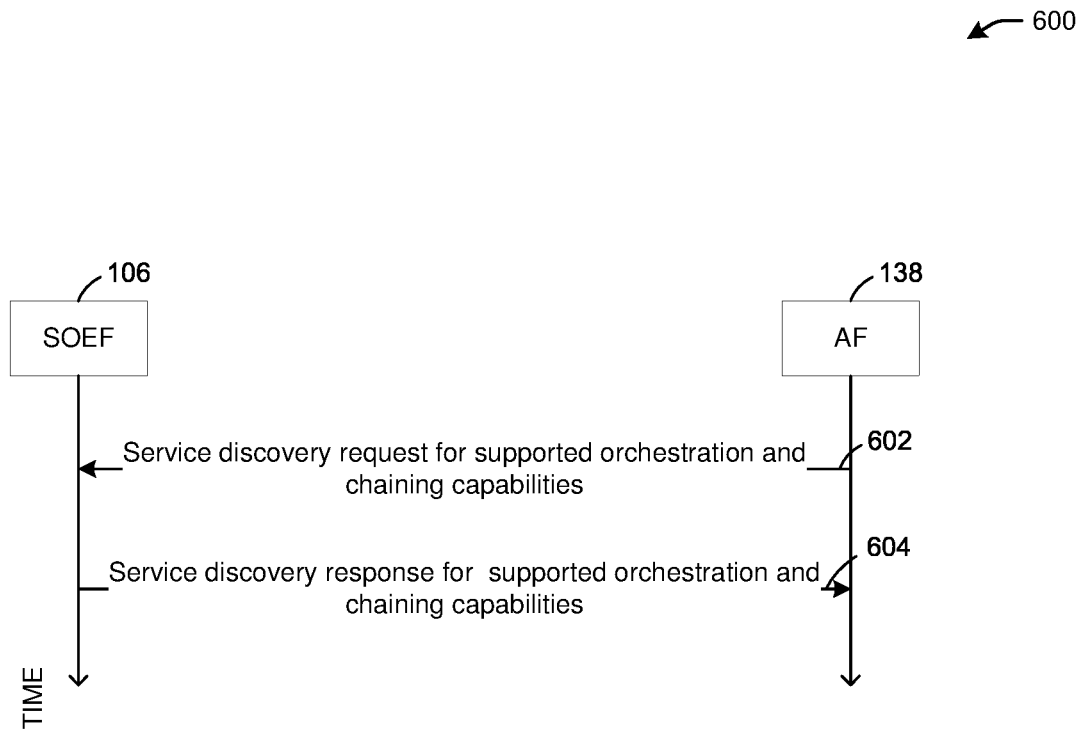
FIG. 6 shows a process for service discovery for performing a SFC service as an enhancement to 5G system architecture, in accordance with one or more example embodiments of the present disclosure.

FIG. 6 shows a process 600 for service discovery for performing a SFC service as an enhancement to 5G system architecture, in accordance with one or more example embodiments of the present disclosure.

Referring to FIG. 6, the process 600 may include the SOEF 106 and the AF 138 of FIG. 1. At step 602, the AF 138 sends a service discovery request to the SOEF 106 for the supported orchestration and chaining capabilities include the following: (1) To setup a SFC service for an application based on the requirements from the AF 138; (2) To modify a SFC service for an application from the AF 138; (3) To subscribe to a SFC events and be notified by the SOEF 106; and (4) Application-level information about a service function, e.g., an identifier to a service function image or a description of a service function type. At step 604, the SOEF 106 sends a service discovery response to the AF 138 for the supported orchestration and chaining capabilities as indicated in step 602.

Figure 7:
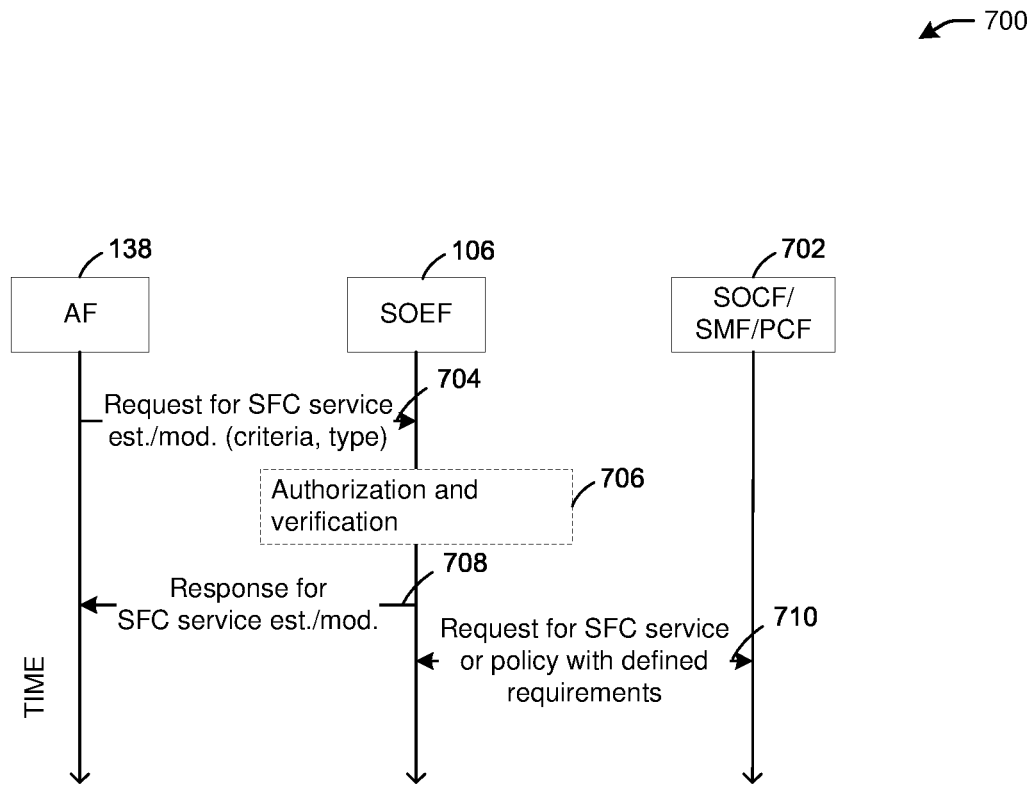
FIG. 7 shows a process for performing a SFC service as an enhancement to 5G system architecture, in accordance with one or more example embodiments of the present disclosure.

FIG. 7 shows a process 700 for performing a SFC service as an enhancement to 5G system architecture, in accordance with one or more example embodiments of the present disclosure.

Referring to FIG. 7, the process 700 may include the SOEF 106 and the AF 138 of FIG. 1, and a SOCF/SMF/PCF 702 (e.g., the SOCF 114 of FIG. 1, the SMF 116 of FIG. 1, the PCF 102 of FIG. 1). At step 704, the AF 138 requests SFC service, policy establishment, or modification, to the SOEF 106, including the criteria for the service. At step 706, optionally, the SOEF 106 can request authorization and verification for the request (e.g., with the UDM 136 or the PCF 102 of FIG. 1). At step 708, the SOEF 106 sends a response for the SFC service or policy establishment/modification. If the request was not successful, a reason may be included. At step 710, the SOEF 106 sends a request for SFC service or policy establishment/modification to the SOCF/SMF/PCF 702 to perform the authorized request on SFC based on the options described in 5.1.3.

Figure 8:
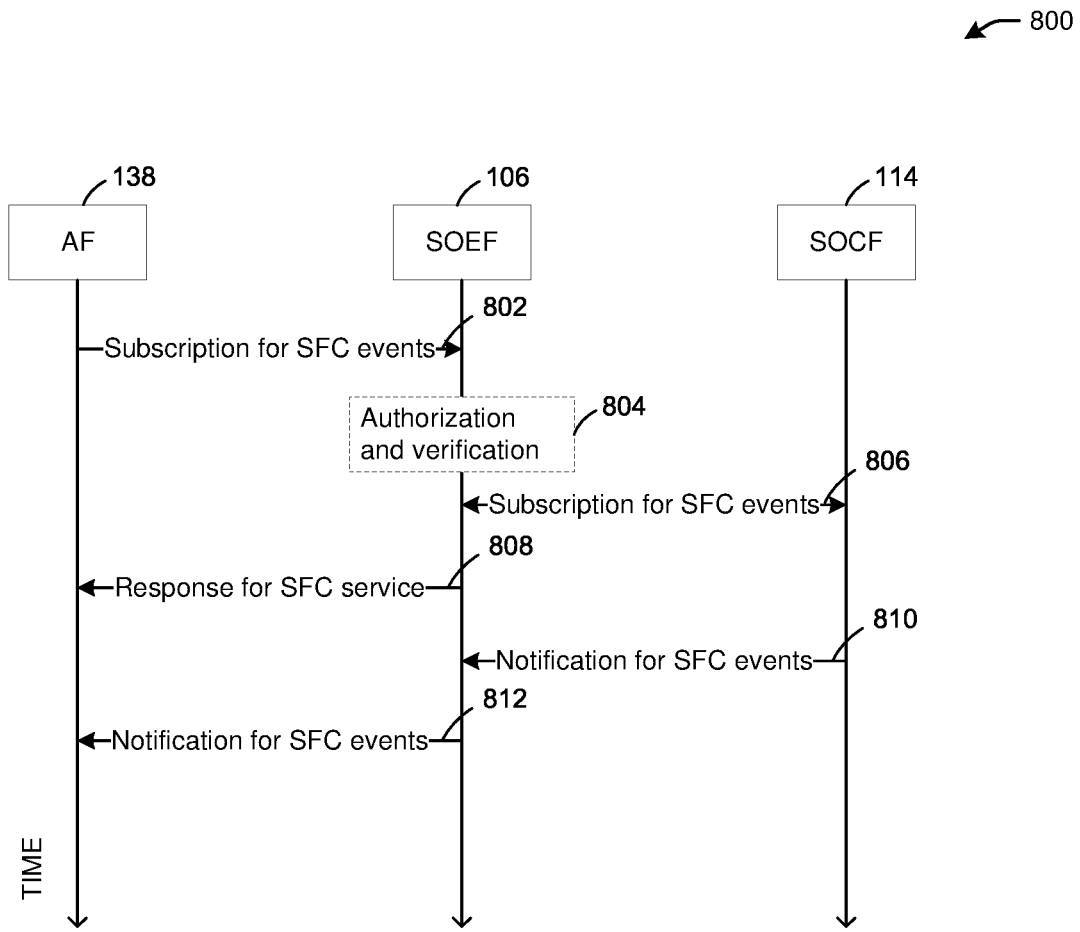
FIG. 8 shows a process for subscribing to SFC event notifications as an enhancement to 5G system architecture, in accordance with one or more example embodiments of the present disclosure.

FIG. 8 shows a process 800 for subscribing to SFC event notifications as an enhancement to 5G system architecture, in accordance with one or more example embodiments of the present disclosure.

Referring to FIG. 8, the process 800 may include the AF 138, the SOEF 106, and the SOCF 114 of FIG. 1. At step 802, the AF 138 sends a request to subscribe to existing SFC service events or orchestration and chaining service events to the SOEF 106. This message may include a description of the event, a SFC flow ID, application ID, UE ID or UE group ID, and/or criteria for a SFC flow based on the SFC context. At step 804, the SOEF 106 can request authorization and verification for the request (e.g., with the UDM 136 or the PCF 102 of FIG. 1). At step 806, after authorization, the SOEF 106 requests to the SOCF 114 to subscribe to existing SFC service events or orchestration and chaining service events. At step 808, the SOEF 106 sends a response to the AF 138 to indicate whether the subscription is successful or not. In case of a failure, a reason may be included. At step 810, the SOCF 114 sends a notification to the SOEF 106 based on the criteria set by AF/SOEF when a related event is detected. At step 812, the SOEF 106 sends a notification to the AF 138 about the detected events.

Figure 9:
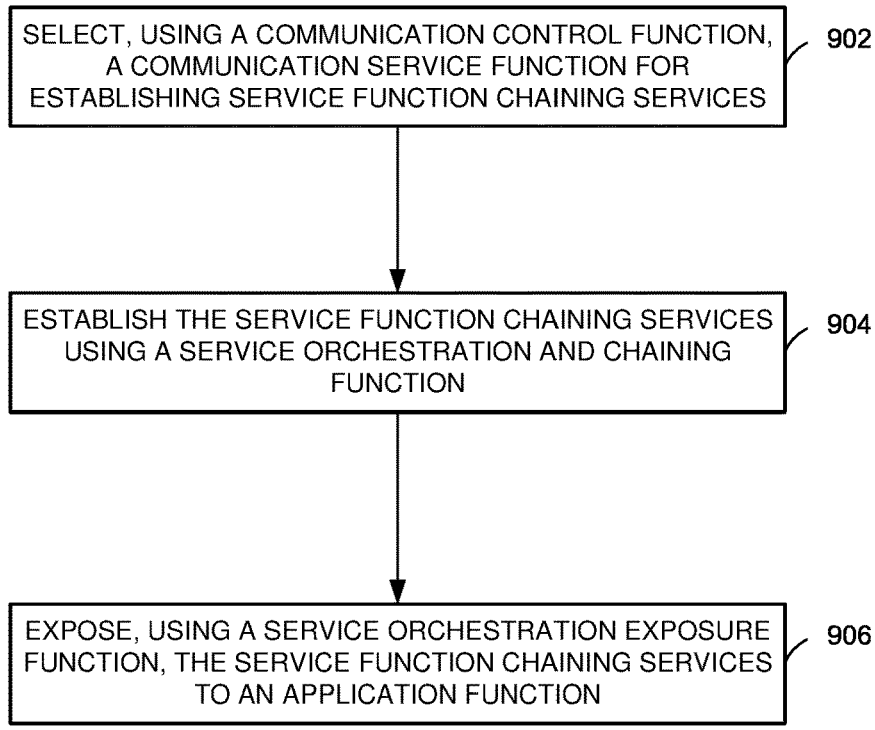
FIG. 9 illustrates a flow diagram of illustrative process for performing a SFC service as an enhancement to 5G system architecture, in accordance with one or more example embodiments of the present disclosure.

FIG. 9 illustrates a flow diagram of illustrative process 900 for performing a SFC service as an enhancement to 5G system architecture, in accordance with one or more example embodiments of the present disclosure.

At block 902, a system (e.g., the 6G system architecture 100 of FIG. 1) may use the comm. CF 112 of FIG. 1 to select a communication service function (e.g., the comm. SF 124 of FIG. 1) for use in establishing SFC services.

At block 904, the system may use the SOCF 114 of FIG. 1 to establish the SFC services.

At block 906 the system may expose the SFC services to the AF 138 of FIG. 1 by using the SOEF 106 of FIG. 1.

It is understood that the above descriptions are for purposes of illustration and are not meant to be limiting.

FIG. 10 illustrates a network 1000, in accordance with one or more example embodiments of the present disclosure.

The 6G system architecture 100 of FIG. 1 may add to and enhance the network 1000. In this manner, the components of the 6G system architecture 100 that also are shown in FIG. 10 may be capable of the functionalities described below with respect to FIG. 10, and to the additional enhanced functionalities described above with respect to FIG. 1.

The network 1000 may operate in a manner consistent with 3GPP technical specifications for LTE or 5G/NR systems. However, the example embodiments are not limited in this regard and the described embodiments may apply to other networks that benefit from the principles described herein, such as future 3GPP systems (e.g., 5G systems), or the like.

The network 1000 may include a UE 1002, which may include any mobile or non-mobile computing device designed to communicate with a RAN 1004 via an over-the-air connection. The UE 1002 may be communicatively coupled with the RAN 1004 by a Uu interface. The UE 1002 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 1000 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 1002 may additionally communicate with an AP 1006 via an over-the-air connection. The AP 1006 may manage a WLAN connection, which may serve to offload some/all network traffic from the RAN 1004. The connection between the UE 1002 and the AP 1006 may be consistent with any IEEE 802.11 protocol, wherein the AP 1006 could be a wireless fidelity (Wi-Fi®) router. In some embodiments, the UE 1002, RAN 1004, and AP 1006 may utilize cellular-WLAN aggregation (for example, LWA/LWIP). Cellular-WLAN aggregation may involve the UE 1002 being configured by the RAN 1004 to utilize both cellular radio resources and WLAN resources.

The RAN 1004 may include one or more access nodes, for example, AN 1008. AN 1008 may terminate air-interface protocols for the UE 1002 by providing access stratum protocols including RRC, PDCP, RLC, MAC, and L1 protocols. In this manner, the AN 1008 may enable data/voice connectivity between CN 1020 and the UE 1002. In some embodiments, the AN 1008 may be implemented in a discrete device or as one or more software entities running on server computers as part of, for example, a virtual network, which may be referred to as a CRAN or virtual baseband unit pool. The AN 1008 be referred to as a BS, gNB, RAN node, eNB, ng-eNB, NodeB, RSU, TRxP, TRP, etc. The AN 1008 may be a macrocell base station or a low power base station for providing femtocells, picocells or other like cells having smaller coverage areas, smaller user capacity, or higher bandwidth compared to macrocells.

In embodiments in which the RAN 1004 includes a plurality of ANs, they may be coupled with one another via an X2 interface (if the RAN 1004 is an LTE RAN) or an Xn interface (if the RAN 1004 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 1004 may each manage one or more cells, cell groups, component carriers, etc. to provide the UE 1002 with an air interface for network access. The UE 1002 may be simultaneously connected with a plurality of cells provided by the same or different ANs of the RAN 1004. For example, the UE 1002 and RAN 1004 may use carrier aggregation to allow the UE 1002 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 1004 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 1002 or AN 1008 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 1004 may be an LTE RAN 1010 with eNBs, for example, eNB 1012. The LTE RAN 1010 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 1004 may be an NG-RAN 1014 with gNBs, for example, gNB 1016, or ng-eNBs, for example, ng-eNB 1018. The gNB 1016 may connect with 5G-enabled UEs using a 5G NR interface. The gNB 1016 may connect with a 5G core through an NG interface, which may include an N2 interface or an N3 interface. The ng-eNB 1018 may also connect with the 5G core through an NG interface, but may connect with a UE via an LTE air interface. The gNB 1016 and the ng-eNB 1018 may connect with each other over an Xn interface.

In some embodiments, the NG interface may be split into two parts, an NG user plane (NG-U) interface, which carries traffic data between the nodes of the NG-RAN 1014 and a UPF 1048 (e.g., N3 interface), and an NG control plane (NG-C) interface, which is a signaling interface between the nodes of the NG-RAN 1014 and an AMF 1044 (e.g., N2 interface).

The NG-RAN 1014 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 1002 can be configured with multiple BWPs where each BWP configuration has a different SCS. When a BWP change is indicated to the UE 1002, the SCS of the transmission is changed as well. Another use case example of BWP is related to power saving. In particular, multiple BWPs can be configured for the UE 1002 with different amount of frequency resources (for example, PRBs) to support data transmission under different traffic loading scenarios. A BWP containing a smaller number of PRBs can be used for data transmission with small traffic load while allowing power saving at the UE 1002 and in some cases at the gNB 1016. A BWP containing a larger number of PRBs can be used for scenarios with higher traffic load.

The RAN 1004 is communicatively coupled to CN 1020 that includes network elements to provide various functions to support data and telecommunications services to customers/subscribers (for example, users of UE 1002). The components of the CN 1020 may be implemented in one physical node or separate physical nodes. In some embodiments, NFV may be utilized to virtualize any or all of the functions provided by the network elements of the CN 1020 onto physical compute/storage resources in servers, switches, etc. A logical instantiation of the CN 1020 may be referred to as a network slice, and a logical instantiation of a portion of the CN 1020 may be referred to as a network sub-slice.

In some embodiments, the CN 1020 may be an LTE CN 1022, which may also be referred to as an EPC. The LTE CN 1022 may include MME 1024, SGW 1026, SGSN 1028, HSS 1030, PGW 1032, and PCRF 1034 coupled with one another over interfaces (or "reference points") as shown. Functions of the elements of the LTE CN 1022 may be briefly introduced as follows.

The MME 1024 may implement mobility management functions to track a current location of the UE 1002 to facilitate paging, bearer activation/deactivation, handovers, gateway selection, authentication, etc.

The SGW 1026 may terminate an SI interface toward the RAN and route data packets between the RAN and the LTE CN 1022. The SGW 1026 may be a local mobility anchor point for inter-RAN node handovers and also may provide an anchor for inter-3GPP mobility. Other responsibilities may include lawful intercept, charging, and some policy enforcement.

The SGSN 1028 may track a location of the UE 1002 and perform security functions and access control. In addition, the SGSN 1028 may perform inter-EPC node signaling for mobility between different RAT networks; PDN and S-GW selection as specified by MME 1024; MME selection for handovers; etc. The S3 reference point between the MME 1024 and the SGSN 1028 may enable user and bearer information exchange for inter-3GPP access network mobility in idle/active states.

The HSS 1030 may include a database for network users, including subscription-related information to support the network entities' handling of communication sessions. The HSS 1030 can provide support for routing/roaming, authentication, authorization, naming/addressing resolution, location dependencies, etc. An S6a reference point between the HSS 1030 and the MME 1024 may enable transfer of subscription and authentication data for authenticating/authorizing user access to the LTE CN 1020.

The PGW 1032 may terminate an SGi interface toward a data network (DN) 1036 that may include an application/content server 1038. The PGW 1032 may route data packets between the LTE CN 1022 and the data network 1036. The PGW 1032 may be coupled with the SGW 1026 by an S5 reference point to facilitate user plane tunneling and tunnel management. The PGW 1032 may further include a node for policy enforcement and charging data collection (for example, PCEF). Additionally, the SGi reference point between the PGW 1032 and the data network 1036 may be an operator external public, a private PDN, or an intra-operator packet data network, for example, for provision of IMS services. The PGW 1032 may be coupled with a PCRF 1034 via a Gx reference point.

The PCRF 1034 is the policy and charging control element of the LTE CN 1022. The PCRF 1034 may be communicatively coupled to the app/content server 1038 to determine appropriate QoS and charging parameters for service flows. The PCRF 1032 may provision associated rules into a PCEF (via Gx reference point) with appropriate TFT and QCI.

In some embodiments, the CN 1020 may be a 5GC 1040. The 5GC 1040 may include an AUSF 1042, AMF 1044, SMF 1046, UPF 1048, NSSF 1050, NEF 1052, NRF 1054, PCF 1056, UDM 1058, AF 1060, and LMF 1062 coupled with one another over interfaces (or "reference points") as shown. Functions of the elements of the 5GC 1040 may be briefly introduced as follows.

The AUSF 1042 may store data for authentication of UE 1002 and handle authentication-related functionality. The AUSF 1042 may facilitate a common authentication framework for various access types. In addition to communicating with other elements of the 5GC 1040 over reference points as shown, the AUSF 1042 may exhibit an Nausf service-based interface.

The AMF 1044 may allow other functions of the 5GC 1040 to communicate with the UE 1002 and the RAN 1004 and to subscribe to notifications about mobility events with respect to the UE 1002. The AMF 1044 may be responsible for registration management (for example, for registering UE 1002), connection management, reachability management, mobility management, lawful interception of AMF-related events, and access authentication and authorization. The AMF 1044 may provide transport for SM messages between the UE 1002 and the SMF 1046, and act as a transparent proxy for routing SM messages. AMF 1044 may also provide transport for SMS messages between UE 1002 and an SMSF. AMF 1044 may interact with the AUSF 1042 and the UE 1002 to perform various security anchor and context management functions. Furthermore, AMF 1044 may be a termination point of a RAN CP interface, which may include or be an N2 reference point between the RAN 1004 and the AMF 1044; and the AMF 1044 may be a termination point of NAS (N1) signaling, and perform NAS ciphering and integrity protection. AMF 1044 may also support NAS signaling with the UE 1002 over an N3 IWF interface.

The SMF 1046 may be responsible for SM (for example, session establishment, tunnel management between UPF 1048 and AN 1008); UE IP address allocation and management (including optional authorization); selection and control of UP function; configuring traffic steering at UPF 1048 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 1044 over N2 to AN 1008; and determining SSC mode of a session. SM may refer to management of a PDU session, and a PDU session or "session" may refer to a PDU connectivity service that provides or enables the exchange of PDUs between the UE 1002 and the data network 1036.

The UPF 1048 may act as an anchor point for intra-RAT and inter-RAT mobility, an external PDU session point of interconnect to data network 1036, and a branching point to support multi-homed PDU session. The UPF 1048 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 1048 may include an uplink classifier to support routing traffic flows to a data network.

The NSSF 1050 may select a set of network slice instances serving the UE 1002. The NSSF 1050 may also determine allowed NSSAI and the mapping to the subscribed S-NSSAIs, if needed. The NSSF 1050 may also determine the AMF set to be used to serve the UE 1002, or a list of candidate AMFs based on a suitable configuration and possibly by querying the NRF 1054. The selection of a set of network slice instances for the UE 1002 may be triggered by the AMF 1044 with which the UE 1002 is registered by interacting with the NSSF 1050, which may lead to a change of AMF. The NSSF 1050 may interact with the AMF 1044 via an N22 reference point; and may communicate with another NSSF in a visited network via an N31 reference point (not shown). Additionally, the NSSF 1050 may exhibit an Nnssf service-based interface.

The NEF 1052 may securely expose services and capabilities provided by 3GPP network functions for third parties, internal exposure/re-exposure, AFs (e.g., AF 1060), edge computing or fog computing systems, etc. In such embodiments, the NEF 352 may authenticate, authorize, or throttle the AFs. NEF 1052 may also translate information exchanged with the AF 1060 and information exchanged with internal network functions. For example, the NEF 1052 may translate between an AF-Service-Identifier and an internal 5GC information. NEF 1052 may also receive information from other NFs based on exposed capabilities of other NFs. This information may be stored at the NEF 1052 as structured data, or at a data storage NF using standardized interfaces. The stored information can then be re-exposed by the NEF 1052 to other NFs and AFs, or used for other purposes such as analytics. Additionally, the NEF 1052 may exhibit an Nnef service-based interface.

The NRF 1054 may support service discovery functions, receive NF discovery requests from NF instances, and provide the information of the discovered NF instances to the NF instances. NRF 1054 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 1054 may exhibit the Nnrf service-based interface.

The PCF 1056 may provide policy rules to control plane functions to enforce them, and may also support unified policy framework to govern network behavior. The PCF 1056 may also implement a front end to access subscription information relevant for policy decisions in a UDR of the UDM 1058. In addition to communicating with functions over reference points as shown, the PCF 1056 exhibit an Npcf service-based interface.

The UDM 1058 may handle subscription-related information to support the network entities' handling of communication sessions, and may store subscription data of UE 1002. For example, subscription data may be communicated via an N8 reference point between the UDM 1058 and the AMF 1044. The UDM 1058 may include two parts, an application front end and a UDR. The UDR may store subscription data and policy data for the UDM 1058 and the PCF 1056, and/or structured data for exposure and application data (including PFDs for application detection, application request information for multiple UEs 1002) for the NEF 1052. The Nudr service-based interface may be exhibited by the UDR 1021 to allow the UDM 1058, PCF 1056, and NEF 1052 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 1058 may exhibit the Nudm service-based interface.

The AF 1060 may provide application influence on traffic routing, provide access to NEF, and interact with the policy framework for policy control.

In some embodiments, the 5GC 1040 may enable edge computing by selecting operator/3rd party services to be geographically close to a point that the UE 1002 is attached to the network. This may reduce latency and load on the network. To provide edge-computing implementations, the 5GC 1040 may select a UPF 1048 close to the UE 1002 and execute traffic steering from the UPF 1048 to data network 1036 via the N6 interface. This may be based on the UE subscription data, UE location, and information provided by the AF 1060. In this way, the AF 1060 may influence UPF (re)selection and traffic routing. Based on operator deployment, when AF 1060 is considered to be a trusted entity, the network operator may permit AF 1060 to interact directly with relevant NFs. Additionally, the AF 1060 may exhibit an Naf service-based interface.

The data network 1036 may represent various network operator services, Internet access, or third party services that may be provided by one or more servers including, for example, application/content server 1038.

The LMF 1062 may receive measurement information (e.g., measurement reports) from the NG-RAN 1014 and/or the UE 1002 via the AMF 1044. The LMF 1062 may use the measurement information to determine device locations for indoor and/or outdoor positioning.

Figure 11:
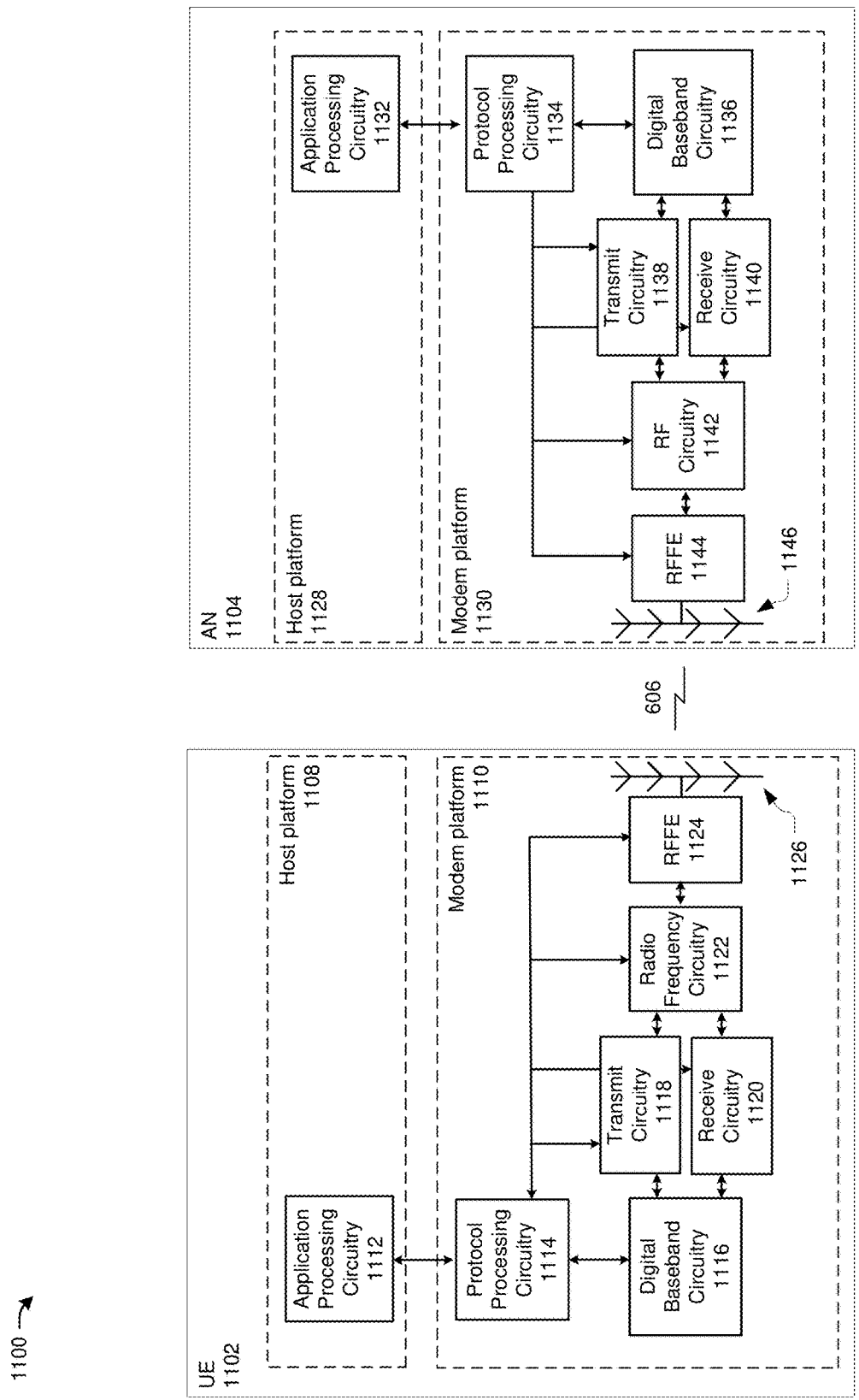
FIG. 11 schematically illustrates a wireless network, in accordance with one or more example embodiments of the present disclosure.

FIG. 11 schematically illustrates a wireless network 1100, in accordance with one or more example embodiments of the present disclosure.

The wireless network 1100 may include a UE 1102 in wireless communication with an AN 1104. The UE 1102 and AN 1104 may be similar to, and substantially interchangeable with, like-named components described elsewhere herein.

The UE 1102 may be communicatively coupled with the AN 1104 via connection 1106. The connection 1106 is illustrated as an air interface to enable communicative coupling, and can be consistent with cellular communications protocols such as an LTE protocol or a 5G NR protocol operating at mmWave or sub-6 GHZ frequencies.

The UE 1102 may include a host platform 1108 coupled with a modem platform 1110. The host platform 1108 may include application processing circuitry 1112, which may be coupled with protocol processing circuitry 1114 of the modem platform 1110. The application processing circuitry 1112 may run various applications for the UE 1102 that source/sink application data. The application processing circuitry 1112 may further implement one or more layer operations to transmit/receive application data to/from a data network. These layer operations may include transport (for example UDP) and Internet (for example, IP) operations The protocol processing circuitry 1114 may implement one or more of layer operations to facilitate transmission or reception of data over the connection 1106. The layer operations implemented by the protocol processing circuitry 1114 may include, for example, MAC, RLC, PDCP, RRC and NAS operations.

The modem platform 1110 may further include digital baseband circuitry 1116 that may implement one or more layer operations that are "below" layer operations performed by the protocol processing circuitry 1114 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 1110 may further include transmit circuitry 1118, receive circuitry 1120, RF circuitry 1122, and RF front end (RFFE) 1124, which may include or connect to one or more antenna panels 1126. Briefly, the transmit circuitry 1118 may include a digital-to-analog converter, mixer, intermediate frequency (IF) components, etc.; the receive circuitry 1120 may include an analog-to-digital converter, mixer, IF components, etc.; the RF circuitry 1122 may include a low-noise amplifier, a power amplifier, power tracking components, etc.; RFFE 1124 may include filters (for example, surface/bulk acoustic wave filters), switches, antenna tuners, beamforming components (for example, phase-array antenna components), etc. The selection and arrangement of the components of the transmit circuitry 1118, receive circuitry 1120, RF circuitry 1122, RFFE 1124, and antenna panels 1126 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 1114 may include one or more instances of control circuitry (not shown) to provide control functions for the transmit/receive components.

A UE reception may be established by and via the antenna panels 1126, RFFE 1124, RF circuitry 1122, receive circuitry 1120, digital baseband circuitry 1116, and protocol processing circuitry 1114. In some embodiments, the antenna panels 1126 may receive a transmission from the AN 1104 by receive-beamforming signals received by a plurality of antennas/antenna elements of the one or more antenna panels 1126.

A UE transmission may be established by and via the protocol processing circuitry 1114, digital baseband circuitry 1116, transmit circuitry 1118, RF circuitry 1122, RFFE 1124, and antenna panels 1126. In some embodiments, the transmit components of the UE 1104 may apply a spatial filter to the data to be transmitted to form a transmit beam emitted by the antenna elements of the antenna panels 1126.

Similar to the UE 1102, the AN 1104 may include a host platform 1128 coupled with a modem platform 1130. The host platform 1128 may include application processing circuitry 1132 coupled with protocol processing circuitry 1134 of the modem platform 1130. The modem platform may further include digital baseband circuitry 1136, transmit circuitry 1138, receive circuitry 1140, RF circuitry 1142, RFFE circuitry 1144, and antenna panels 1146. The components of the AN 1104 may be similar to and substantially interchangeable with like-named components of the UE 1102. In addition to performing data transmission/reception as described above, the components of the AN 1108 may perform various logical functions that include, for example, RNC functions such as radio bearer management, uplink and downlink dynamic radio resource management, and data packet scheduling.

Figure 12:
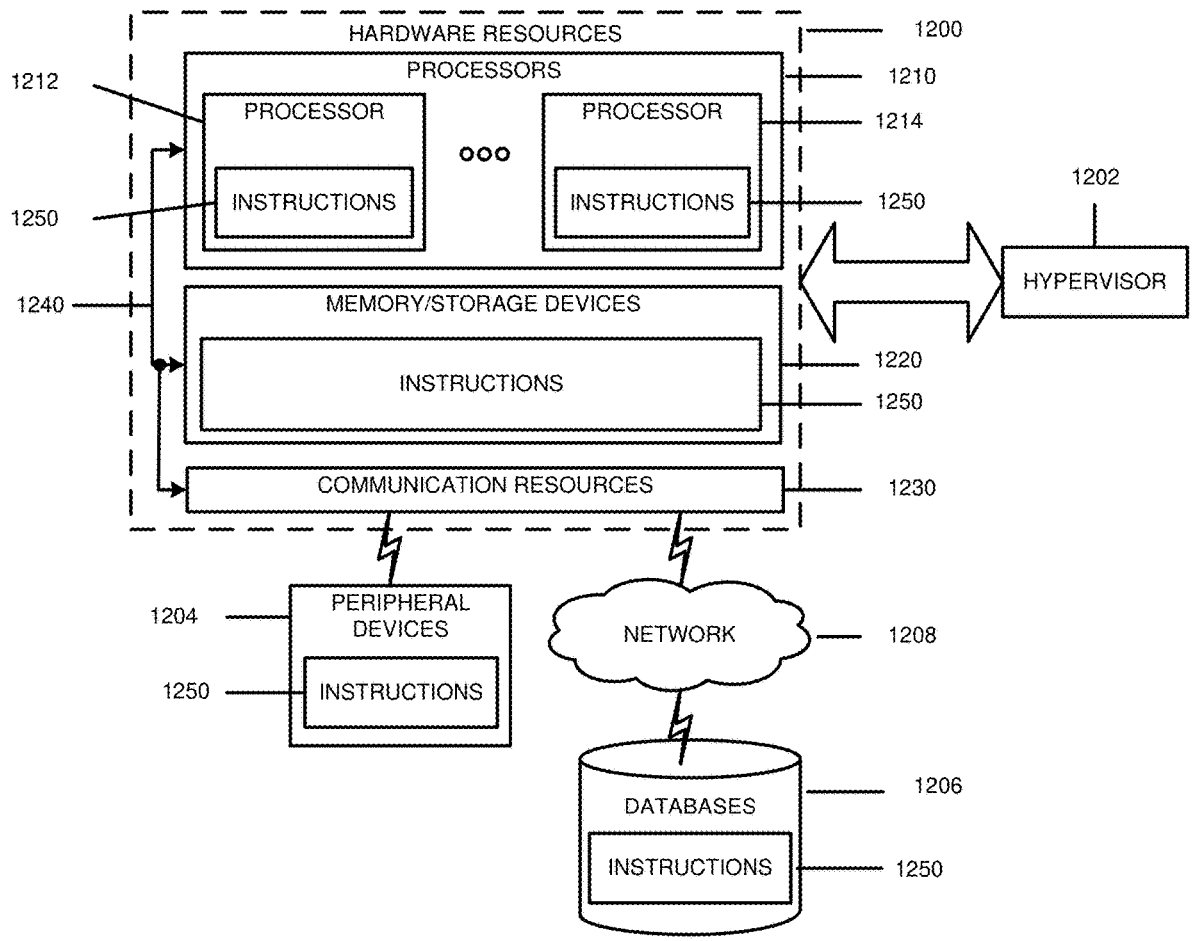
FIG. 12 is a block diagram illustrating components, in accordance with one or more example embodiments of the present disclosure.

FIG. 12 is a block diagram 1200 illustrating components, in accordance with one or more example embodiments of the present disclosure.

The components may be able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources including one or more processors (or processor cores) 1210, one or more memory/storage devices 1220, and one or more communication resources 1230, each of which may be communicatively coupled via a bus 1240 or other interface circuitry. For embodiments where node virtualization (e.g., NFV) is utilized, a hypervisor 1202 may be executed to provide an execution environment for one or more network slices/sub-slices to utilize the hardware resources.

The processors 1210 may include, for example, a processor 1212 and a processor 1214. The processors 1210 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1220 may include main memory, disk storage, or any suitable combination thereof. The memory/storage devices 1220 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1230 may include interconnection or network interface controllers, components, or other suitable devices to communicate with one or more peripheral devices 1204 or one or more databases 1206 or other network elements via a network 1208. For example, the communication resources 1230 may include wired communication components (e.g., for coupling via USB, Ethernet, etc.), cellular communication components, NFC components, Bluetooth® (or Bluetooth® Low Energy) components, Wi-Fi® components, and other communication components.

Instructions 1250 may comprise software, a program, an application, an applet, an app, or other executable code for causing at least any of the processors 1210 to perform any one or more of the methodologies discussed herein. The instructions 1250 may reside, completely or partially, within at least one of the processors 1210 (e.g., within the processor's cache memory), the memory/storage devices 1220, or any suitable combination thereof. Furthermore, any portion of the instructions 1250 may be transferred to the hardware resources from any combination of the peripheral devices 1204 or the databases 1206. Accordingly, the memory of processors 1210, the memory/storage devices 1220, the peripheral devices 1204, and the databases 1206 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Various embodiments are described below.

Example 1 may be a system for performing service function chaining in wireless networks, the system comprising: a communication control function configured to select a communication service function associated with establishing service function chaining (SFC) services for telecommunications; a service orchestration and chaining function (SOCF) configured to establish the SFC services; and a service orchestration exposure function (SOEF) configured to expose the SFC services to an application function (AF) of the system.

Example 2 may include the system of example 1 and/or some other example herein, wherein the communication control function is further configured to: provide a communication service associated with session management for the SFC services to a network function of the system; configure the communication service function for at least one of supported transport or networking protocols, traffic flow matching rules, routing information based on the traffic flow matching rules, or an action performed based on the traffic flow matching rules; onboard the communication service function; offboard the communication service function; and migrate the communication service function.

Example 3 may include the system of example 1 and/or some other example herein, wherein the communication service function is configured to: route packets on a user plane; attach packet labels based on a configuration of the communication control function; modify packet labels based on the configuration of the communication control function; remove packet labels based on the configuration of the communication control function; apply traffic flow matching rules based on the configuration of the communication control function; perform an action based on the traffic flow matching rules; and report traffic to the communication control function.

Example 4 may include the system of any of examples 1-3 and/or some other example herein, wherein the SOCF is further configured to: provide the SFC services to a network function or a user equipment of the system; generate a computing plane configuration; generate a communication plane configuration; generate a data plane configuration; and generate a record based on transactions associated with the SFC services.

Example 5 may include the system of example 1 and/or some other example herein, wherein the system is configured to receive a user equipment request for the SFC services, the user equipment request comprising at least three of: a service identifier indicative of a SFC service of the SFC services; an application identifier; a user equipment identifier; a network slice identifier; an access type; a session identifier; traffic classification rules; a security key; a service continuity mode; network chains for service functions; quality of service requirements; a location associated with the communication service function; a network type; or routing rules.

Example 6 may include the system of example 1 and/or some other example herein, wherein the SOCF is further configured to: initiate a service of the SFC services; update the service; release the service; subscribe to the service; and generate notifications associated with the service.

Example 7 may include the system of example 1 and/or some other example herein, wherein the communication service function is configured in a SFC user plane for a traffic path associated with the SFC services, the communication service function associated with a session management function (SMF) configured to: request a computing service function of the SFC services; and request a data function of the SFC services.

Example 8 may include the system of example 1 and/or some other example herein, wherein the communication service function is associated with a SMF configured to select the SOCF, wherein the SOCF is further configured to: allocate a service identifier for the SFC services; and generate requirements for a communication plane, a computing plane, and a data plane.

Example 9 may include the system of example 1 and/or some other example herein, wherein the SOCF is further configured to allocate a service identifier for the SFC services, and wherein the communication control function is further configured to provide the service identifier to a radio access network (RAN) of the system.

Example 10 may include the system of example 1 and/or some other example herein, wherein the SOCF is further configured to: send, to a network repository function (NRF) of the system, a location of the SOCF, a SFC capability of the SOCF, a network slice of the SOCF, a managed application type, and performance metrics associated with the SFC services, and wherein a network function (NF) of the system selects the SOCF based on a list of SOCFs provided by the NRF.

Example 11 may include the system of example 1 and/or some other example herein, further comprising: an application function (AF) configured to send a service discovery request, indicative of SFC capabilities, to a service orchestration exposure function (SOEF) of the system, wherein the SOEF is configured to send, to the AF, a service discovery response based on the SFC capabilities.

Example 12 may include the system of example 1 and/or some other example herein, further comprising: an AF configured to send a first request to the SOEF for the SFC services, including criteria for the SFC services, wherein the SOEF is configured to: determine that the first request for the SFC services is authorized; send, to the AF, a response to the first request for the SFC services; and send a second request for the SFC services based on the authorization.

Example 13 may include the system of example 1 and/or some other example herein, further comprising an AF configured to: send, to a SOEF of the system, a first request to subscribe to events associated with the SFC services, wherein the first request to subscribe comprises: descriptions of the events, a SFC flow identifier, an application identifier, a user equipment identifier, and criteria for a SFC flow; and wherein the SOEF is configured to: determine that the first request to subscribe is authorized; send, to the AF, a response to the first request to subscribe; and send a second request to subscribe based on the authorization, and wherein the SOCF is further configured to: send a first notification, to the SOEF, indicative of the events; and send a second notification, to the AF, indicative of the events.

Example 14 may include a computer-readable storage medium comprising instructions to cause processing circuitry of a communications network system, upon execution of the instructions by the processing circuitry, to: cause a communication control function of the communications network system to select a communication service function associated with establishing service function chaining (SFC) services for telecommunications; cause a service orchestration and chaining function (SOCF) of the communications network system to establish the SFC services; and cause a service orchestration exposure function (SOEF) of the communications network system to expose the SFC services to an application function (AF) of the communications network system.

Example 15 may include the computer-readable medium of example 14 and/or some other example herein, wherein execution of the instructions further causes the communication control function configured to: provide the SFC services to a network function of the system; configure the communication service function for at least one of supported transport or networking protocols, traffic flow matching rules, routing information based on the traffic flow matching rules, or an action performed based on the traffic flow matching rules; onboard the communication service function; offboard the communication service function; and migrate the communication service function.

Example 16 may include the computer-readable medium of example 14 and/or some other example herein, wherein execution of the instructions further causes the communication service to: route packets on a user plane; attach packet labels based on a configuration of the communication control function; modify packet labels based on the configuration of the communication control function; remove packet labels based on the configuration of the communication control function; apply traffic flow matching rules based on the configuration of the communication control function; perform an action based on the traffic flow matching rules; report traffic to the communication control function.

Example 17 may include the computer-readable medium of any of examples 14-16 and/or some other example herein, wherein execution of the instructions further causes the SOCF to: provide the SFC services to a network function or a user equipment of the system; generate a computing plane configuration; generate a communication plane configuration; generation a data plane configuration; and generate a record based on transactions associated with the SFC services.

Example 18 may include the computer-readable medium of example 14 and/or some other example herein, wherein execution of the instructions further causes the communications network system to receive a user equipment request for the SFC services, the user equipment request comprising at least three of: a service identifier indicative of a SFC service of the SFC services; an application identifier; a user equipment identifier; a network slice identifier; an access type; a session identifier; traffic classification rules; a security key; a service continuity mode; network chains for service functions; quality of service requirements; a location associated with the communication service function; a network type; or routing rules.

Example 19 may include the computer-readable medium of example 14 and/or some other example herein, wherein execution of the instructions further causes the SOCF to: initiate a service of the SFC services; update the service; release the service; subscribe to the service; and generate notifications associated with the service.

Example 20 may include a method for performing service function chaining in wireless networks, the method comprising: causing, by processing circuitry of a communications network system, a communication control function of the communications network system to select a communication service function associated with establishing service function chaining (SFC) services for telecommunications; causing, by the processing circuitry, a service orchestration and chaining function (SOCF) of the communications network system to establish the SFC services; and causing, by the processing circuitry, a service orchestration exposure function (SOEF) of the communications network system to expose the SFC services to an application function (AF) of the communications network system.

Example 21 may include the method of example 20 and/or some other example herein, further comprising: causing the communication service function to configure a SFC user plane for a traffic path associated with the SFC services, the communication service function associated with a session management function (SMF); causing the SMF to request a computing service function of the SFC services; and causing the SMF to request a data function of the SFC services.

Example 22 may include the method of example 20 and/or some other example herein, wherein the communication service function is associated with a SMF, the method further comprising: causing the SMF to select the SOCF; causing the SOCF to allocate a service identifier for the SFC services; and causing the SOCF to generate requirements for a communication plane, a computing plane, and a data plane.

Example 23 may include the method of example 20 and/or some other example herein, further comprising: causing the SOCF to allocate a service identifier for the SFC services; and causing the communication control function to provide the service identifier to a radio access network (RAN) of the system.

Example 24 may include an apparatus comprising means for: causing, by a communications network system, a communication control function of the communications network system to select a communication service function associated with establishing service function chaining (SFC) services for telecommunications; causing a service orchestration and chaining function (SOCF) of the communications network system to establish the SFC services; and causing a service orchestration exposure function (SOEF) of the communications network system to expose the SFC services to an application function (AF) of the communications network system.

Example 25 may include one or more non-transitory computer-readable media comprising instructions to cause an electronic device, upon execution of the instructions by one or more processors of the electronic device, to perform one or more elements of a method described in or related to any of examples 1-24, or any other method or process described herein.

Example 26 may include an apparatus comprising logic, modules, and/or circuitry to perform one or more elements of a method described in or related to any of examples 1-24, or any other method or process described herein.

Example 27 may include a method, technique, or process as described in or related to any of examples 1-24, or portions or parts thereof.

Example 28 may include an apparatus comprising: one or more processors and one or more computer readable media comprising instructions that, when executed by the one or more processors, cause the one or more processors to perform the method, techniques, or process as described in or related to any of examples 1-24, or portions thereof.

Example 29 may include a method of communicating in a wireless network as shown and described herein.

Example 30 may include a system for providing wireless communication as shown and described herein.

Example 31 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

Unless used differently herein, terms, definitions, and abbreviations may be consistent with terms, definitions, and abbreviations defined in 3GPP TR 21.905 v16.0.0 (2019 June) and/or any other 3GPP standard. For the purposes of the present document, the following abbreviations (shown in Table 2) may apply to the examples and embodiments discussed herein.

TABLE 2

Abbreviations:

| | |
|---|---|
| 3GPP | Third Generation Partnership Project |
| 4G | Fourth Generation |
| 5G | Fifth Generation |
| 5GC | 5G Core network |
| AC | Application Client |
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CFRA | Contention Free Random Access |
| CG | Cell Group |
| CGF | Charging Gateway Function |
| CHF | Charging Function |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information |

TABLE 2-continued

Abbreviations:

| | | |
|---|---|---|
| | Resource Indicator, CSI-RS Resource Indicator | |
| C-RNTI | Cell RNTI | |
| CS | Circuit Switched | |
| CSAR | Cloud Service Archive | |
| CSI | Channel-State Information | |
| CSI-IM | CSI Interference Measurement | |
| CSI-RS | CSI Reference Signal | |
| CSI-RSRP | CSI reference signal received power | |
| CSI-RSRQ | CSI reference signal received quality | |
| CSI-SINR | CSI signal-to-noise and interference ratio | |
| CSMA | Carrier Sense Multiple Access | |
| CSMA/CA | CSMA with collision avoidance | |
| CSS | Common Search Space, Cell-specific Search Space | |
| CTF | Charging Trigger Function | |
| CTS | Clear-to-Send | |
| CW | Codeword | |
| CWS | Contention Window Size | |
| D2D | Device-to-Device | |
| DC | Dual Connectivity, Direct Current | |
| DCI | Downlink Control Information | |
| DF | Deployment Flavour | |
| DL | Downlink | |
| DMTF | Distributed Management Task Force | |
| DPDK | Data Plane Development Kit | |
| DM-RS, | DMRS Demodulation Reference Signal | |
| DN | Data network | |
| DNN | Data Network Name | |
| DNAI | Data Network Access Identifier | |
| DRB | Data Radio Bearer | |
| DRS | Discovery Reference Signal | |
| DRX | Discontinuous Reception | |
| DSL | Domain Specific Language. Digital Subscriber Line | |
| DSLAM | DSL Access Multiplexer | |
| DwPTS | Downlink Pilot Time Slot | |
| E-LAN | Ethernet Local Area Network | |
| E2E | End-to-End | |
| ECCA | extended clear channel assessment, extended CCA | |
| ECCE | Enhanced Control Channel Element, Enhanced CCE | |
| ED | Energy Detection | |
| EDGE | Enhanced Datarates for GSM Evolution (GSM Evolution) | |
| EAS | Edge Application Server | |
| EASID | Edge Application Server Identification | |
| ECS | Edge Configuration Server | |

TABLE 2-continued

Abbreviations:

| | | |
|---|---|---|
| ECSP | Edge Computing Service Provider | |
| EDN | Edge Data Network | |
| EEC | Edge Enabler Client | |
| EECID | Edge Enabler Client Identification | |
| EES | Edge Enabler Server | |
| EESID | Edge Enabler Server Identification | |
| EHE | Edge Hosting Environment | |
| EGMF | Exposure Governance tableManagement Function | |
| EGPRS | Enhanced GPRS | |
| EIR | Equipment Identity Register | |
| eLAA | enhanced Licensed Assisted Access, enhanced LAA | |
| EM | Element Manager | |
| eMBB | Enhanced Mobile Broadband | |
| EMS | Element Management System | |
| eNB | evolved NodeB, E-UTRAN Node B | |
| EN-DC | E-UTRA-NR Dual Connectivity | |
| EPC | Evolved Packet Core | |
| EPDCCH | enhanced PDCCH, enhanced Physical Downlink Control Cannel | |
| EPRE | Energy per resource element | |
| EPS | Evolved Packet System | |
| EREG | enhanced REG, enhanced resource element groups | |
| ETSI | European Telecommunications Standards Institute | |
| ETWS | Earthquake and Tsunami Warning System | |
| eUICC | embedded UICC, embedded Universal Integrated Circuit Card | |
| E-UTRA | Evolved UTRA | |
| E-UTRAN | Evolved UTRAN | |
| EV2X | Enhanced V2X | |
| F1AP | F1 Application Protocol | |
| F1-C | F1 Control plane interface | |
| F1-U | F1 User plane interface | |
| FACCH | Fast Associated Control CHannel | |
| FACCH/F | Fast Associated Control Channel/Full rate | |
| FACCH/H | Fast Associated Control Channel/Half rate | |
| FACH | Forward Access Channel | |
| FAUSCH | Fast Uplink Signalling Channel | |
| FB | Functional Block | |
| FBI | Feedback Information | |
| FCC | Federal Communications Commission | |
| FCCH | Frequency Correction | |

TABLE 2-continued

Abbreviations:

| | |
|---|---|
| | CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Spécial Mobile |
| GTP | GPRS Tunneling Protocol |
| GTP-U | GPRS Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia Public identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International |

TABLE 2-continued

Abbreviations:

| | |
|---|---|
| | Organisation for Standardisation |
| ISP | Internet Service Provider |
| IWF | Interworking-Function |
| I-WLAN | Interworking WLAN |
| | Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-I | MAC used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTC | massive MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, |

TABLE 2-continued

Abbreviations:

| | | | |
|---|---|---|---|
| | Non-Access Stratum layer | OSI | Other System Information |
| NCT | Network Connectivity Topology | OSS | Operations Support System |
| NC-JT | Non-Coherent Joint Transmission | OTA | over-the-air |
| NEC | Network Capability Exposure | PAPR | Peak-to-Average Power Ratio |
| NE-DC | NR-E-UTRA Dual Connectivity | PAR | Peak to Average Ratio |
| | | PBCH | Physical Broadcast Channel |
| NEF | Network Exposure Function | PC | Power Control, Personal Computer |
| NF | Network Function | PCC | Primary Component Carrier, Primary CC |
| NFP | Network Forwarding Path | PCell | Primary Cell |
| NFPD | Network Forwarding Path Descriptor | PCI | Physical Cell ID, Physical Cell Identity |
| NFV | Network Functions Virtualization | PCEF | Policy and Charging Enforcement Function |
| NFVI | NFV Infrastructure | PCF | Policy Control Function |
| NFVO | NFV Orchestrator | | |
| NG | Next Generation, Next Gen | PCRF | Policy Control and Charging Rules Function |
| NGEN-DC | NG-RAN E-UTRA-NR Dual Connectivity | | |
| NM | Network Manager | PDCP | Packet Data Convergence Protocol, Packet Data Convergence Protocol layer |
| NMS | Network Management System | | |
| N-PoP | Network Point of Presence | | |
| NMIB, N-MIB | Narrowband MIB | PDCCH | Physical Downlink Control Channel |
| NPBCH | Narrowband Physical Broadcast CHannel | | |
| NPDCCH | Narrowband Physical Downlink Control CHannel | PDCP | Packet Data Convergence Protocol |
| | | PDN | Packet Data Network, Public Data Network |
| NPDSCH | Narrowband Physical Downlink Shared CHannel | PDSCH | Physical Downlink Shared Channel |
| NPRACH | Narrowband Physical Random Access CHannel | PDU | Protocol Data Unit |
| NPUSCH | Narrowband Physical Uplink Shared CHannel | PEI | Permanent Equipment Identifiers |
| NPSS | Narrowband Primary Synchronization Signal | PFD | Packet Flow Description |
| NSSS | Narrowband Secondary Synchronization Signal | P-GW | PDN Gateway |
| | | PHICH | Physical hybrid-ARQ indicator channel |
| NR | New Radio, Neighbour Relation | PHY | Physical layer |
| NRF | NF Repository Function | PLMN | Public Land Mobile Network |
| NRS | Narrowband Reference Signal | PIN | Personal Identification Number |
| NS | Network Service | | |
| NSA | Non-Standalone operation mode | PM | Performance Measurement |
| NSD | Network Service Descriptor | PMI | Precoding Matrix Indicator |
| NSR | Network Service Record | PNF | Physical Network Function |
| NSSAI | Network Slice Selection Assistance Information | PNFD | Physical Network Function Descriptor |
| S-NNSAI | Single-NSSAI | PNFR | Physical Network Function Record |
| NSSF | Network Slice Selection Function | POC | PTT over Cellular |
| NW | Network | PP, PTP | Point-to-Point |
| NWUS | Narrowband wake-up signal, Narrowband WUS | PPP | Point-to-Point Protocol |
| | | PRACH | Physical RACH |
| | | PRB | Physical resource block |
| NZP | Non-Zero Power | | |
| O&M | Operation and Maintenance | PRG | Physical resource block group |
| ODU2 | Optical channel Data Unit - type 2 | ProSe | Proximity Services, Proximity-Based Service |
| OFDM | Orthogonal Frequency Division Multiplexing | PRS | Positioning Reference Signal |
| OFDMA | Orthogonal Frequency Division Multiple Access | PRR | Packet Reception Radio |
| OOB | Out-of-band | PS | Packet Services |
| OOS | Out of Sync | PSBCH | Physical Sidelink Broadcast Channel |
| OPEX | OPerating EXpense | | |

TABLE 2-continued

| Abbreviations: | |
|---|---|
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |

TABLE 2-continued

| Abbreviations: | |
|---|---|
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block |
| SSID | Service Set Identifier |
| SS/PBCH | Block |
| SSBRI | SS/PBCH Block Resource Indicator, Synchronization Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastructure |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, |
| VLAN | Virtual LAN, Virtual |

TABLE 2-continued

Abbreviations:

| | |
|---|---|
| | Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over-Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Po |

What is claimed is:

1. A system for performing service function chaining in wireless networks, the system comprising:
   processing circuitry of a communication control function, of a core wireless network, configured to select a communication service function associated with establishing service function chaining (SFC) services for telecommunications;
   processing circuitry of a service orchestration and chaining function (SOCF), of the core wireless network, configured to establish the SFC services; and
   processing circuitry of a service orchestration exposure function (SOEF), of the core wireless network, configured to expose the SFC services to an application function (AF) of the system.

2. The system of claim 1, wherein the processing circuitry of the communication control function is further configured to:
   provide a communication service associated with session management for the SFC services to a network function of the system;
   configure the communication service function for at least one of supported transport or networking protocols, traffic flow matching rules, routing information based on the traffic flow matching rules, or an action performed based on the traffic flow matching rules;
   onboard the communication service function;
   offboard the communication service function; and
   migrate the communication service function.

3. The system of claim 1, wherein the processing circuitry of the communication service function is configured to:
   route packets on a user plane;
   attach packet labels based on a configuration of the communication control function;
   modify packet labels based on the configuration of the communication control function;
   remove packet labels based on the configuration of the communication control function;
   apply traffic flow matching rules based on the configuration of the communication control function;
   perform an action based on the traffic flow matching rules; and
   report traffic to the communication control function.

4. The system of claim 3, wherein the processing circuitry of the SOCF is further configured to:
   provide the SFC services to a network function or a user equipment of the system;
   generate a computing plane configuration;
   generate a communication plane configuration;
   generate a data plane configuration; and
   generate a record based on transactions associated with the SFC services.

5. The system of claim 1, wherein the system is configured to receive a user equipment request for the SFC services, the user equipment request comprising at least three of:
   a service identifier indicative of a SFC service of the SFC services;
   an application identifier;
   a user equipment identifier;
   a network slice identifier;
   an access type;
   a session identifier;
   traffic classification rules;
   a security key;
   a service continuity mode;
   network chains for service functions;
   quality of service requirements;
   a location associated with the communication service function;
   a network type; or
   routing rules.

6. The system of claim 1, wherein the processing circuitry of the SOCF is further configured to:
   initiate a service of the SFC services;
   update the service;
   release the service;
   subscribe to the service; and
   generate notifications associated with the service.

7. The system of claim 1, wherein the processing circuitry of the communication service function is configured in a SFC user plane for a traffic path associated with the SFC services, the processing circuitry of the communication service function associated with a session management function (SMF) configured to:
   request a computing service function of the SFC services; and
   request a data function of the SFC services.

8. The system of claim 1, wherein the processing circuitry of the communication service function is associated with a SMF configured to select the SOCF, wherein the processing circuitry of the SOCF is further configured to:
   allocate a service identifier for the SFC services; and
   generate requirements for a communication plane, a computing plane, and a data plane.

9. The system of claim 1, wherein the processing circuitry of the SOCF is further configured to allocate a service identifier for the SFC services, and wherein the communication control function is further configured to provide the service identifier to a radio access network (RAN) of the system.

10. The system of claim 1, wherein the processing circuitry of the SOCF is further configured to:
    send, to a network repository function (NRF) of the system, a location of the SOCF, a SFC capability of the SOCF, a network slice of the SOCF, a managed application type, and performance metrics associated with the SFC services, and wherein a network function (NF) of the system selects the SOCF based on a list of SOCFs provided by the NRF.

11. The system of claim 1, further comprising:
processing circuitry of an application function (AF), of the core wireless network, configured to send a service discovery request, indicative of SFC capabilities, to a service orchestration exposure function (SOEF) of the system,
wherein the processing circuitry of the SOEF is configured to send, to the AF, a service discovery response based on the SFC capabilities.

12. The system of claim 1, further comprising:
processing circuitry of an AF, of the core wireless network, configured to send a first request to the SOEF for the SFC services, including criteria for the SFC services,
wherein the processing circuitry of the SOEF is configured to:
determine that the first request for the SFC services is authorized;
send, to the AF, a response to the first request for the SFC services; and
send a second request for the SFC services based on the authorization.

13. The system of claim 1, further comprising processing circuitry of an AF, of the core wireless network, configured to:
send, to a SOEF of the system, a first request to subscribe to events associated with the SFC services, wherein the first request to subscribe comprises:
descriptions of the events,
a SFC flow identifier,
an application identifier,
a user equipment identifier, and
criteria for a SFC flow; and
wherein the processing circuitry of the SOEF is configured to:
determine that the first request to subscribe is authorized;
send, to the AF, a response to the first request to subscribe; and
send a second request to subscribe based on the authorization,
and wherein the processing circuitry of the SOCF is further configured to:
send a first notification, to the SOEF, indicative of the events; and
send a second notification, to the AF, indicative of the events.

14. A non-transitory computer-readable storage medium comprising instructions to cause processing circuitry of a core wireless network, upon execution of the instructions by the processing circuitry, to:
cause a communication control function of a core wireless network to select a communication service function associated with establishing service function chaining (SFC) services for telecommunications;
cause a service orchestration and chaining function (SOCF) of the core wireless network to establish the SFC services; and cause a service orchestration exposure function (SOEF) of the core wireless network to expose the SFC services to an application function (AF) of the core wireless network.

15. The non-transitory computer-readable storage medium of claim 14, wherein execution of the instructions further causes the communication control function configured to:
provide the SFC services to a network function of the core wireless network;
configure the communication service function for at least one of supported transport or networking protocols, traffic flow matching rules, routing information based on the traffic flow matching rules, or an action performed based on the traffic flow matching rules;
onboard the communication service function;
offboard the communication service function; and
migrate the communication service function.

16. The non-transitory computer-readable storage medium of claim 14, wherein execution of the instructions further causes the communication service function to:
route packets on a user plane;
attach packet labels based on a configuration of the communication control function;
modify packet labels based on the configuration of the communication control function;
remove packet labels based on the configuration of the communication control function;
apply traffic flow matching rules based on the configuration of the communication control function;
perform an action based on the traffic flow matching rules; and
report traffic to the communication control function.

17. The non-transitory computer-readable storage medium of any of claim 16, wherein execution of the instructions further causes the SOCF to:
provide the SFC services to a network function of the core wireless network or to a user equipment;
generate a computing plane configuration;
generate a communication plane configuration;
generation a data plane configuration; and
generate a record based on transactions associated with the SFC services.

18. The non-transitory computer-readable storage medium of claim 14, wherein execution of the instructions further causes the core wireless network to receive a user equipment request for the SFC services, the user equipment request comprising at least three of:
a service identifier indicative of a SFC service of the SFC services;
an application identifier;
a user equipment identifier;
a network slice identifier;
an access type;
a session identifier;
traffic classification rules;
a security key;
a service continuity mode;
network chains for service functions;
quality of service requirements;
a location associated with the communication service function;
a network type; or
routing rules.

19. The non-transitory computer-readable storage medium of claim 14, wherein execution of the instructions further causes the SOCF to:

initiate a service of the SFC services;
update the service;
release the service;
subscribe to the service; and
generate notifications associated with the service.

20. A method for performing service function chaining in wireless networks, the method comprising:

causing, by processing circuitry of a core wireless network, a communication control function of the core wireless network to select a communication service function associated with establishing service function chaining (SFC) services for telecommunications;

causing, by the processing circuitry, a service orchestration and chaining function (SOCF) of the core wireless network to establish the SFC services; and causing, by the processing circuitry, a service orchestration exposure function (SOEF) of the core wireless network to expose the SFC services to an application function (AF) of the core wireless network.

\* \* \* \* \*